(12) United States Patent
Baskaran et al.

(10) Patent No.: US 11,540,125 B2
(45) Date of Patent: Dec. 27, 2022

(54) AUTHENTICATION DEVICE, NETWORK DEVICE, COMMUNICATION SYSTEM, AUTHENTICATION METHOD, AND NON-TRANSITORY COMPUTER READABLE MEDIUM

(71) Applicant: NEC CORPORATION, Tokyo (JP)

(72) Inventors: Sheeba Backia Mary Baskaran, Chennai (IN); Anand Raghawa Prasad, Tokyo (JP); Sivabalan Arumugam, Chennai (IN); Sivakamy Lakshminarayanan, Chennai (IN); Hironori Ito, Tokyo (JP); Andreas Kunz, Heidelberg (DE)

(73) Assignee: NEC CORPORATION, Tokyo (JP)

( * ) Notice: Subject to any disclaimer, the term of this patent is extended or adjusted under 35 U.S.C. 154(b) by 544 days.

(21) Appl. No.: 16/494,524

(22) PCT Filed: Mar. 16, 2018

(86) PCT No.: PCT/JP2018/010582
§ 371 (c)(1),
(2) Date: Sep. 16, 2019

(87) PCT Pub. No.: WO2018/169071
PCT Pub. Date: Sep. 20, 2018

(65) Prior Publication Data
US 2020/0014535 A1 Jan. 9, 2020

(30) Foreign Application Priority Data
Mar. 17, 2017 (IN) .............................. 201711009357

(51) Int. Cl.
*H04W 12/0431* (2021.01)
*G06F 7/58* (2006.01)
(Continued)

(52) U.S. Cl.
CPC ........ *H04W 12/0431* (2021.01); *G06F 7/582* (2013.01); *H04L 9/32* (2013.01);
(Continued)

(58) Field of Classification Search
CPC ........... H04W 12/0431; H04W 12/041; H04W 12/062; G06F 7/582; H04L 9/32;
(Continued)

(56) References Cited

U.S. PATENT DOCUMENTS 11,212,676 B2 * 12/2021 Wu ...................... H04L 63/0892
2005/0063544 A1 * 3/2005 Uusitalo ................. H04L 63/06
380/277

(Continued)

FOREIGN PATENT DOCUMENTS

JP          2016-500977 A       1/2016

OTHER PUBLICATIONS

Communication dated Feb. 12, 2020, from the European Patent Office in European Application No. 18767417.1.
(Continued)

*Primary Examiner* — Abiy Getachew
(74) *Attorney, Agent, or Firm* — Sughrue Mion, PLLC

(57) ABSTRACT

Provided is an authentication device capable of generating a master key suited to a UE in a 5GS. The authentication device (10) includes a communication unit (11) configured to, in registration processing of user equipment (UE), acquire UE key derivation function (KDF) capabilities indicating a pseudo random function supported by the UE, a selection unit (12) configured to select a pseudo random function used for generation of a master key related to the UE by use of the UE KDF capabilities, and a key generation unit (13) configured to generate a master key related to the UE by use of the selected pseudo random function.

10 Claims, 26 Drawing Sheets

(51) Int. Cl.
  *H04L 9/32* (2006.01)
  *H04L 12/04* (2006.01)
  *H04L 12/06* (2006.01)
  *H04W 12/041* (2021.01)
  *H04W 12/062* (2021.01)

(52) U.S. Cl.
  CPC .............. *H04L 12/04* (2013.01); *H04L 12/06* (2013.01); *H04W 12/041* (2021.01); *H04W 12/062* (2021.01); *H04L 2463/081* (2013.01)

(58) Field of Classification Search
  CPC ... H04L 12/04; H04L 12/06; H04L 2463/081; H04L 63/205
  See application file for complete search history.

(56) References Cited

U.S. PATENT DOCUMENTS

| | | | |
|---|---|---|---|
| 2010/0064135 | A1 | 3/2010 | Thakare et al. |
| 2011/0004762 | A1 | 1/2011 | Horn |
| 2011/0167272 | A1 | 7/2011 | Kolesnikov |
| 2011/0268277 | A1* | 11/2011 | Kurokawa ............ H04L 9/3271 380/270 |
| 2016/0156464 | A1* | 6/2016 | Näslund ................ H04L 9/0822 713/171 |

OTHER PUBLICATIONS

3GPP TR 23.799 V2.0.0, "3rd Generation Partnership Project; Technical Specification Group Services and System Aspects; Study on Architecture for Next Generation System (Release 14)", Nov. 2016, pp. 1-523.

3GPP TR 33.899 V1.0.0, "3rd Generation Partnership Project; Technical Specification Group Services and System Aspects; Study on the security aspects of the next generation system (Release 14)", Mar. 2017, pp. 1-470.

Arkko, J. et al, "Improved Extensible Authentication Protocol Method for 3rd Generation Authentication and Key Agreement (EAP-AKA')", RFC 5448, May 2009, pp. 1-29.

3GPP TS 33.402 V14.0.0, "3rd Generation Partnership Project; Technical Specification Group Services and System Aspects; 3GPP System Architecture Evolution (SAE); Security aspects of non-3GPP accesses (Release 14)", Dec. 2016, pp. 1-68.

International Search Report of PCT/JP2018/010582 dated Jun. 19, 2018 [PCT/ISA/210].

* cited by examiner

AUTHENTICATION DEVICE, NETWORK DEVICE, COMMUNICATION SYSTEM, AUTHENTICATION METHOD, AND NON-TRANSITORY COMPUTER READABLE MEDIUM

CROSS REFERENCE TO RELATED APPLICATIONS

This application is a National Stage of International Application No. PCT/JP2018/010582, filed Mar. 16, 2018, claiming priority to Indian Patent Application No. 201711009357, filed Mar. 17, 2017, the contents of all of which are incorporated herein by reference in their entirety.

TECHNICAL FIELD

The present disclosure relates to an authentication device, a network device, a communication system, an authentication method, and a program.

BACKGROUND ART

Authentication processing used in a communication system referred to as 5G (hereinafter 5G System [5GS]) in the 3rd Generation Partnership Project (3GPP) has been under study. For example, Non Patent Literature 1 discloses details of authentication processing used in a 5GS. Specifically, application of Extensible Authentication Protocol (EAP)-Authentication and Key Agreement (AKA) to a 5GS is under study. EAP-AKA is a protocol used for performing mutual authentication and also key exchange between user equipment (UE) being an EAP-peer and a core network device being an EAP-server.

CITATION LIST

Non Patent Literature

Non Patent Literature 1: 3GPP TR 23.799 V2.0.0 (2016 November)

SUMMARY OF INVENTION

Technical Problem

When performing key exchange by use of EAP-AKA, a UE and a core network device need to generate a common master key. In EAP-AKA, a master key is generated by use of a pseudo random function (PRF). However, a core network device may use a pseudo random function not supported by a UE when generating a master key. In this case, there is a problem that the UE and the core network device generate different master keys, respectively, and therefore authentication between the UE and the core network device fails.

An object of the present disclosure is to provide an authentication device, a network device, a communication system, an authentication method, and a program that are capable of generating a master key suited to a UE in a 5GS, in view of the aforementioned problem.

Solution to Problem

An authentication device according to a first aspect of the present disclosure includes a communication unit configured to, in registration processing of user equipment (UE), acquire UE key derivation function (KDF) capabilities indicating a pseudo random function supported by the UE, a selection unit configured to select a pseudo random function used for generation of a master key related to the UE by use of the UE KDF capabilities, and a key generation unit configured to generate a master key related to the UE by use of the selected pseudo random function.

A network device according to a second aspect of the present disclosure includes a communication unit configured to, in registration processing of a UE, acquire authentication information generated based on a master key generated by use of a pseudo random function supported by a UE indicated in UE KDF capabilities, a storage unit configured to store the authentication information, and a communication unit configured to, in re-registration processing of the UE, send the stored authentication information in response to a message requesting authentication information.

A communication system according to a third aspect of the present disclosure includes an authentication device configured to, in registration processing of a UE, generate a master key by use of a pseudo random function supported by a UE indicated in UE KDF capabilities and generate authentication information by use of the master key, and a network device configured to store the authentication information acquired from the authentication device and, in re-registration processing of a UE, send the stored authentication information in response to a message requesting the authentication information.

A authentication method according to a fourth aspect of the present disclosure includes, in registration processing of user equipment (UE), acquiring UE key derivation function (KDF) capabilities indicating a pseudo random function supported by the UE, selecting a pseudo random function used for generation of a master key related to the UE by use of the UE KDF capabilities, and generating a master key related to the UE by use of the selected pseudo random function.

A program according to a fifth aspect of the present disclosure causes a computer to execute, in registration processing of a UE, acquiring authentication information generated based on a master key generated by use of a pseudo random function supported by a UE indicated in UE KDF capabilities, storing the authentication information, and in re-registration processing of the UE, sending the stored authentication information in response to a message requesting authentication information.

Advantageous Effects of Invention

The present disclosure can provide an authentication device, a network device, a communication system, an authentication method, and a program that are capable of generating a master key suited to a UE in a 5GS.

DESCRIPTION OF EMBODIMENTS

First Example Embodiment

Figure 1:
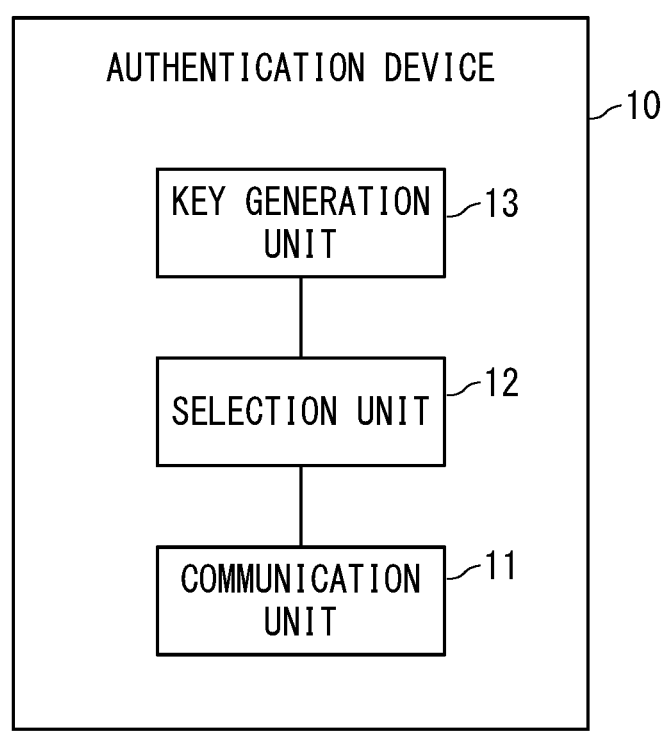
FIG. 1 is a configuration diagram of an authentication device according to a first example embodiment.

Example embodiments of the present disclosure will be described below with reference to drawings. First, a configuration example of an authentication device 10 according to a first example embodiment will be described by use of FIG. 1. The authentication device 10 may be a computer device operating by a processor executing a program stored in a memory.

The authentication device 10 includes a communication unit 11, a selection unit 12, and a key generation unit 13. The communication unit 11, the selection unit 12, and the key generation unit 13 may be software or a module in which processing is executed by a processor executing a program stored in a memory. Alternatively, the communication unit 11, the selection unit 12, and the key generation unit 13 may be hardware such as a circuit or a chip.

In registration processing of user equipment (UE), the communication unit 11 acquires UE key derivation function (KDF) capabilities indicating a pseudo random function supported by the UE. A UE is used as a general term for a communication terminal in the 3GPP. The registration processing is processing of registering a UE to a core network. For example, a core network may be a 5G core (5GC) being a core network used in a 5GS. A 5GC may be referred to as a NextGen. A pseudo random function is used for generating a key used for communication at a UE and the authentication device 10. For example, a key may be a security key or a master key.

The selection unit 12 selects a pseudo random function used for generation of a master key related to a UE, by use of UE KDF capabilities. The key generation unit 13 generates a master key related to the UE by use of the selected pseudo random function. The authentication device 10 has a plurality of pseudo random functions used for generation of a master key. In other words, the authentication device 10 can generate a different master key for each UE.

As described above, the authentication device 10 can acquire UE KDF capabilities indicating a pseudo random function supported by a UE. Consequently, the authentication device 10 can generate the same master key as the UE.

Second Example Embodiment

Figure 2:
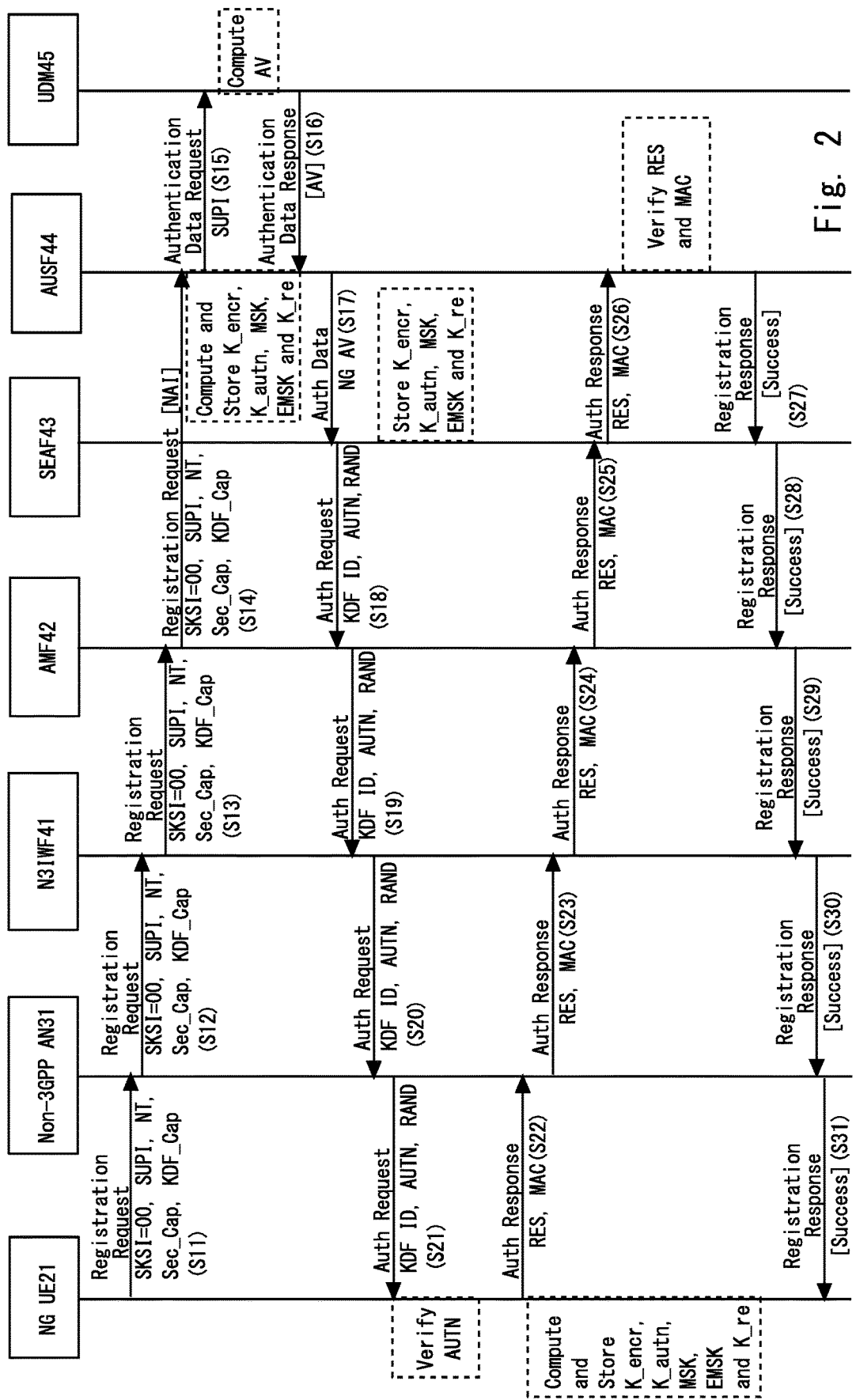
FIG. 2 is a diagram illustrating a flow of registration processing according to a second example embodiment.

Next, a flow of registration processing in a non-3GPP AN according to the second example embodiment will be described by use of FIG. 2. The non-3GPP AN is an access network using a communication mode different from a communication mode for which a standard is set in the 3GPP. In FIG. 2 and subsequent drawings, flows of authentication processing in a communication system including a next generation (NG) UE 21, a non-3GPP access network (AN) 31, a g Node B (gNB) 32, a non-3GPP inter working function (N3IWF) entity 41 (hereinafter referred to as an N3IWF 41), an access and mobility management function (AMF) entity 42 (hereinafter referred to as an AMF 42), a security anchor function (SEAF) entity 43, an authentication server function (AUSF) entity 44 (hereinafter referred to as an AUSF 44), and a unified data management (UDM) 45 will be described.

The N3IWF 41, the AMF 42, the SEAF 43, the AUSF 44, and the UDM 45 constitute a 5GC.

The NG UE 21 is a UE used in a 5GS. The non-3GPP AN 31 is an access network using a communication mode different from a communication mode for which a standard is set in the 3GPP. For example, the non-3GPP AN 31 may be a wireless local area network (LAN). The gNB 32 is a base station supporting a communication mode referred to as 5G being under study in the 3GPP.

The N3IWF 41 communicates with the NG UE 21 through the non-3GPP AN 31. The N3IWF 41 interconnects different networks and relays control data or control (C)-plane data related to the NG UE 21, the data being transmitted between the NG UE 21 and the AMF 42.

The AMF 42 performs mobility management related to the NG UE 21. Additionally, the AMF 42 performs authentication processing related to the NG UE 21 in coordination with the SEAF 43, the AUSF 44, and the UDM 45. The UDM 45 manages subscriber data related to a plurality of UEs including the NG UE 21.

First, the NG UE 21 sends a registration request message to the non-3GPP AN 31 (S11). The registration request message includes a security key set identifier (SKSI), a subscriber parameter identifier (SUPI), a network type (NT), a UE security capabilities (Sec_Cap), and a UE key derivation function capabilities (KDF_Cap).

The SKSI included in the registration request message is set to SKSI=00. SKSI=00 indicates that the NG UE 21 does not hold a security context. For example, a security context may be a master session key (MSK).

For example, an SUPI may be a network access identifier (NAI) or an international mobile subscriber identity (IMSI). The NT indicates a more preferable access network used for transmission of the registration request message.

The Sec_Cap is used for initiating a security mode command (SMC) procedure after successful authentication processing. The KDF_Cap is accompanied by a pseudo random function used for derivation of a master key.

Next, the non-3GPP AN 31 forwards the registration request message to the N3IWF 41 (S12). The non-3GPP AN 31 forwards the registration request message through an NG2 interface set between the non-3GPP AN 31 and the N3IWF 41. The N3IWF 41 enables registration of the NG UE 21 to the 5GC through the non-3GPP AN 31.

Next, the N3IWF 41 forwards the registration request message to the AMF 42 (S13). The AMF 42 fetches an NAI from the IMSI. Additionally, the AMF 42 sends a registration request message to the AUSF 44 along with the NAI (S14). Next, the AUSF 44 validates the received NAI and verifies whether or not the NG UE 21 is authorized to use the NAI. From a numerical value of the NAI, the AUSF 44 identifies a subscriber as a candidate for authentication using enhanced EAP-AKA'. When the verification is successful, the AUSF 44 sends an authentication data request message to the UDM 45 along with a SUPI (for example, an NAI) (S15). The AUSF 44 selects a pseudo random function, based on a preference of the AUSF 44 and the KDF_Cap.

Next, the UDM 45 generates an authentication vector (AV) being authentication information by use of an AMF separation bit 1. The "AMF separation bit" is described to be the first bit out of 16 bits in the AMF according to 3GPP TS 33.102 V13.0.0 (2016 January). Additionally, the UDM 45 sends an authentication data response message including the AV to the AUSF 44 (S16). The AV includes a random number (RAND), a network authentication parameter (AUTN), an expected response (XRES), a cipher key (CK), and an integrity key (IK).

Next, the AUSF 44 derives a CK' and an IK' from the CK and the IK included in the AV. Additionally, the AUSF 44 generates a master key from the CK', the IK', a secret key K, and an access network identifier with the selected PRF according to Step S15. Additionally, the AUSF 44 extracts, from the master key, a confidentiality key (K_encr), an integrity key (K_autn), an MSK, an extended MSK (EMSK), and a re-authentication key (K_re). Furthermore, the AUSF 44 generates an NG AV being authentication information, from each derived key and the AV. The AUSF 44 sends the NG AV to the SEAF 43 (S17). The NG AV includes the AV, a pseudo random function ID (PRF ID), the K_encr, the K_autn, the MSK, the EMSK, and the K_re.

Next, the SEAF 43 keeps the NG AV. Additionally, the SEAF 43 sends an authentication request message related to the NG UE 21 to the AMF 42 (S18). The authentication request message includes an RAND, an AUTN, and a KDF ID. The KDF ID indicates the PRF selected for derivation of the master key in Step S15.

Next, the AMF 42 forwards the authentication request message related to the NG UE 21 to the N3IWF 41 (S19). Next, the N3IWF 41 forwards the authentication request message related to the NG UE 21 to the non-3GPP AN 31 (S20). Next, the non-3GPP AN 31 forwards the authentication request message to the NG UE 21 (S21).

Next, the NG UE 21 validates the received AUTN value in order to perform network authentication. When the validation is successful, the NG UE 21 computes a master key and session key materials by use of the PRF notified in the authentication request message. The session key materials include a K_encr, a K_autn, an MSK, an EMSK, and a K_re. The K_encr and the K_autn are used in computation of a message authentication code (MAC). When the MAC computation is successful, the NG UE 21 sends an authentication response message related to the AUSF 44 to the non-3GPP AN 31 (S22). The authentication response message includes a RES and the MAC.

Next, the non-3GPP AN 31 routes an authentication response message related to the AUSF 44 to the N3IWF 41 (S23). Next, the N3IWF 41 routes the authentication response message related to the AUSF 44 to the AMF 42 (S24). Next, the AMF 42 routes the authentication response message related to the AUSF 44 to the SEAF 43 (S25). Next, the SEAF 43 routes the authentication response message to the AUSF 44 (S26).

Next, the AUSF 44 validates the MAC. Additionally, the AUSF 44 compares the received RES with the XRES. When the verification of the MAC and the RES is successful, the AUSF 44 sends a registration response message including a success message related to the NG UE 21 to the SEAF 43 (S27). Next, the SEAF 43 sends the registration response message including the success message related to the NG UE 21 to the AMF 42 (S28). Next, the AMF 42 sends the registration response message including the success message related to the NG UE 21 to the N3IWF 41 (S29). Next, the N3IWF 41 sends the registration response message including the success message related to the NG UE 21 to the non-3GPP AN 31 (S30). Next, the non-3 GPP AN 31 sends the registration response message including the success message to the NG UE 21 (S31).

Figure 3:
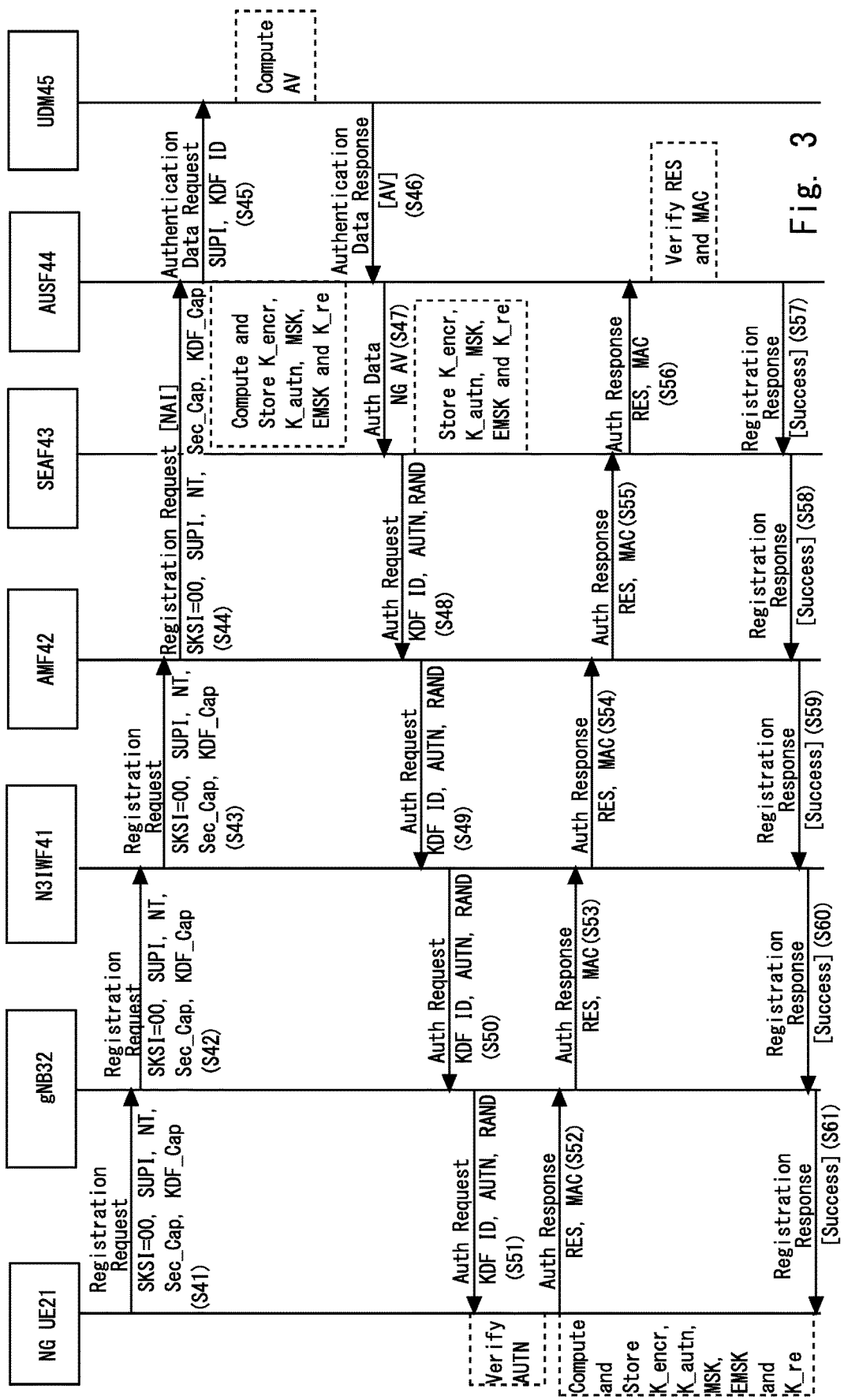
FIG. 3 is a diagram illustrating a flow of registration processing according to the second example embodiment.

Next, a flow of registration processing different from the registration processing in FIG. 2 will be described by use of FIG. 3. The only change in FIG. 3 is that the non-3GPP AN 31 in FIG. 2 is changed to the gNB 32, and Steps S41 to S61 are similar to Steps S11 to S31 in FIG. 2. Accordingly, detailed description of the registration processing in FIG. 3 is omitted.

Figure 4:
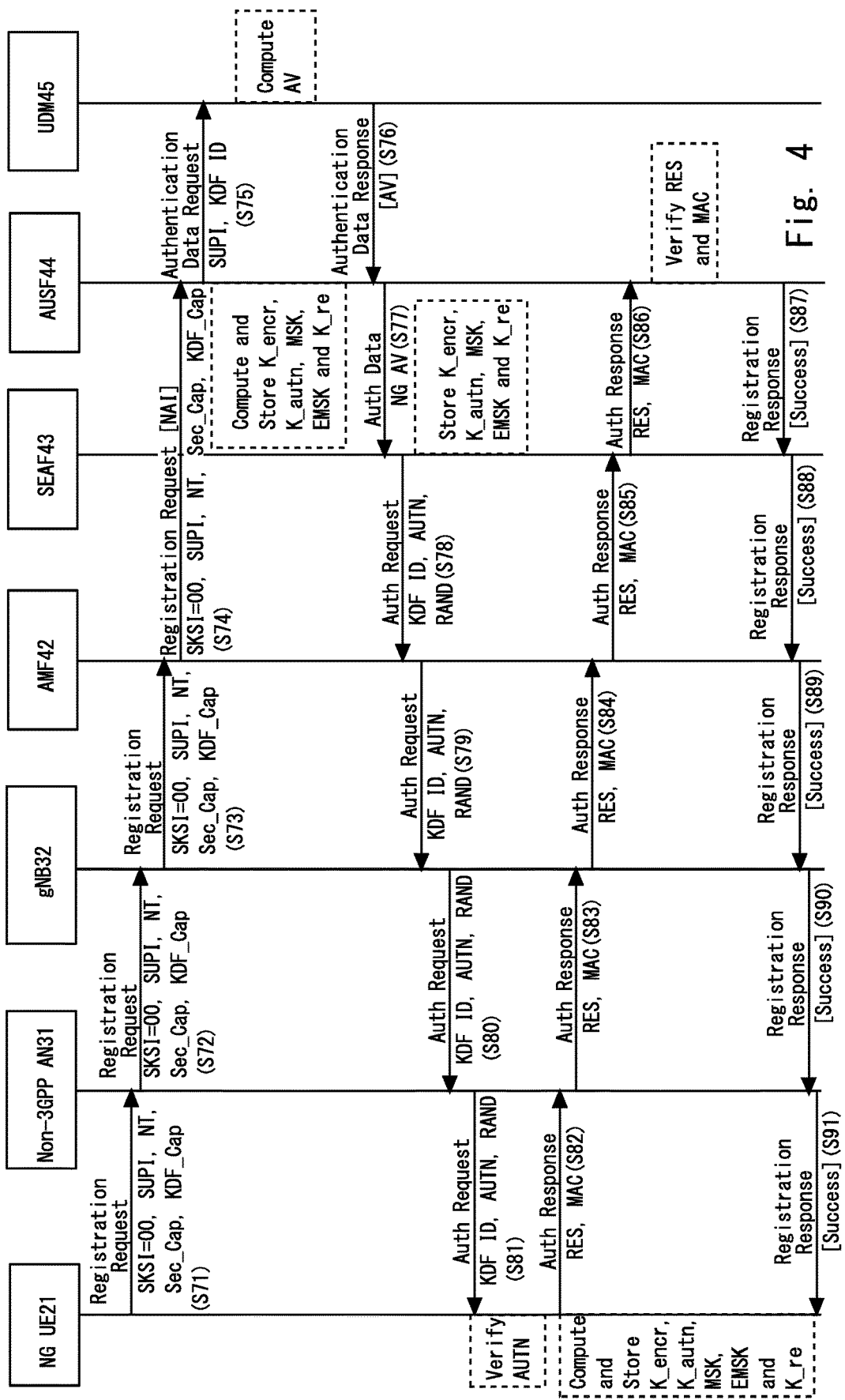
FIG. 4 is a diagram illustrating a flow of registration processing according to the second example embodiment.

Next, a flow of registration processing different from the registration processing in FIG. 2 and FIG. 3 will be described by use of FIG. 4. The only change in FIG. 4 is that the N3IWF 41 in FIG. 2 is changed to the gNB 32, and Steps S71 to S91 are similar to Steps S11 to S31 in FIG. 2. Accordingly, detailed description of the registration processing in FIG. 4 is omitted.

Figure 5:
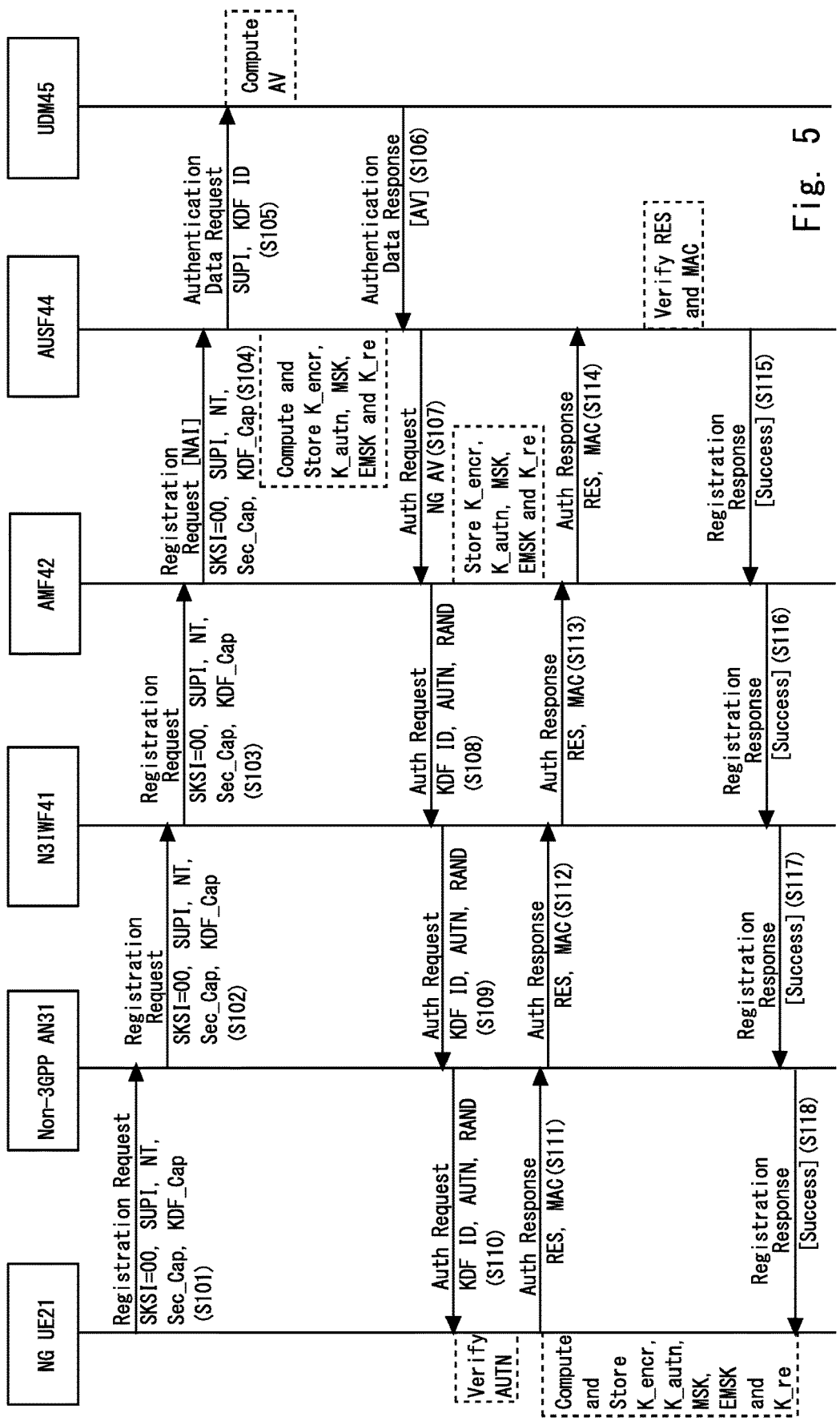
FIG. 5 is a diagram illustrating a flow of registration processing according to the second example embodiment.

Next, a flow of registration processing different from the registration processing in FIG. 2 to FIG. 4 will be described by use of FIG. 5. The processing in the SEAF 43 in FIG. 2 is executed in the AMF 42 in FIG. 5. Steps S101 to S118 are substantially similar to Steps S11 to S31 in FIG. 2. Accordingly, detailed description of the registration processing in FIG. 5 is omitted.

Figure 6:
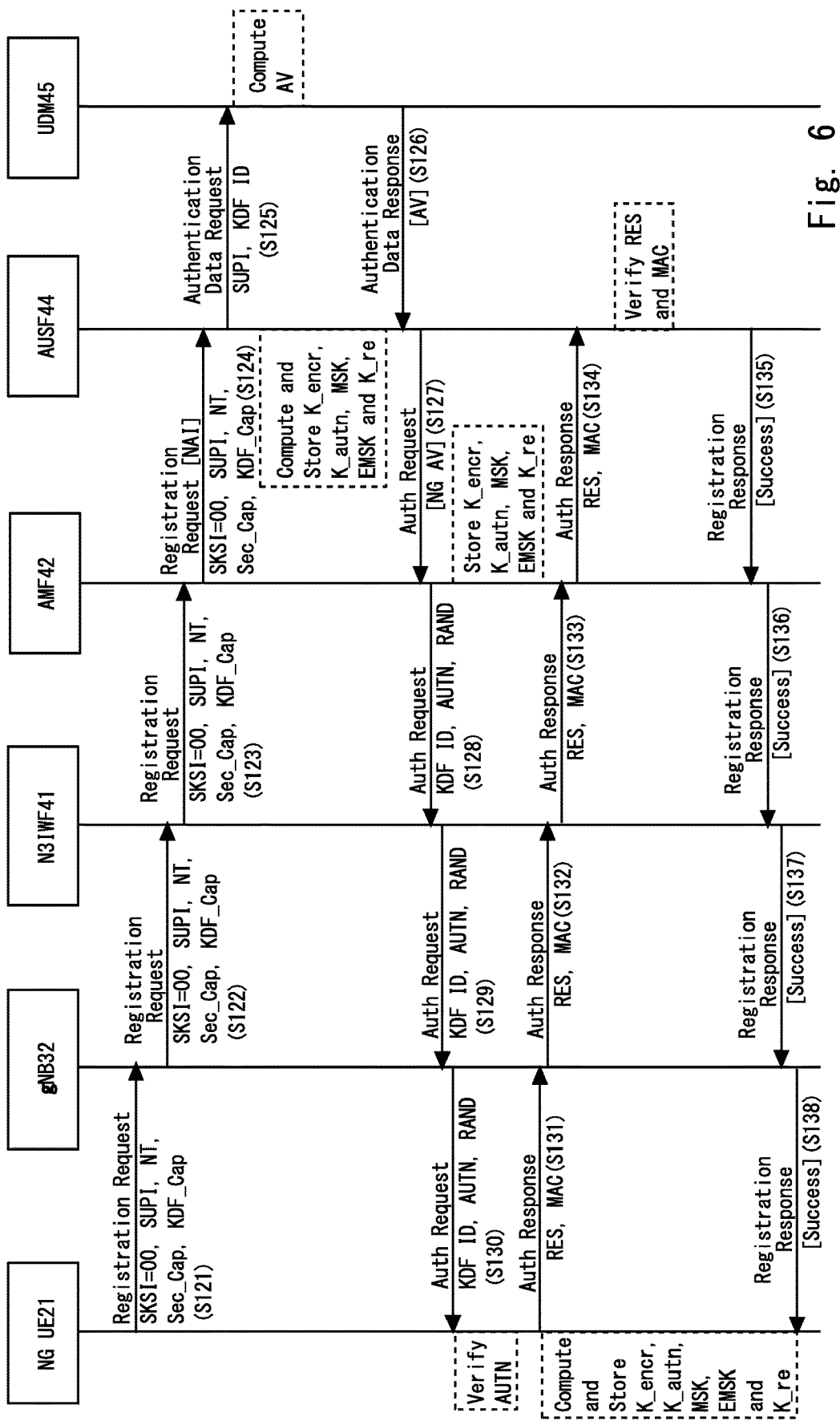
FIG. 6 is a diagram illustrating a flow of registration processing according to the second example embodiment.

Next, a flow of registration processing different from the registration processing in FIG. 2 to FIG. 5 will be described by use of FIG. 6. The only change in FIG. 6 is that the non-3GPP AN 31 in FIG. 5 is changed to the gNB 32, and Steps S121 to S138 are similar to Steps S101 to S118 in FIG. 5. Accordingly, detailed description of the registration processing in FIG. 6 is omitted.

Figure 7:
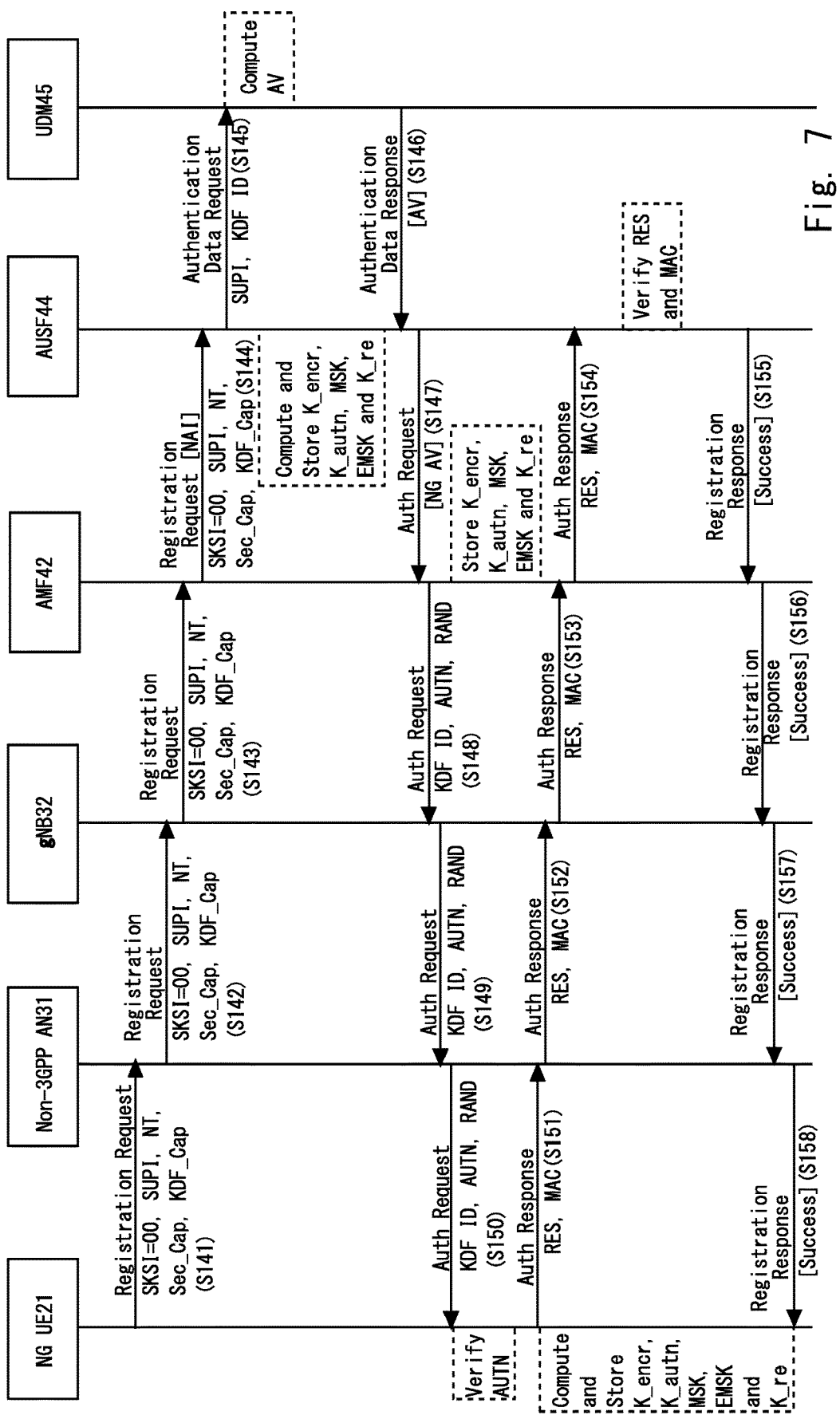
FIG. 7 is a diagram illustrating a flow of registration processing according to the second example embodiment.

Next, a flow of registration processing different from the registration processing in FIG. 2 to FIG. 6 will be described by use of FIG. 7. The only change in FIG. 7 is that the N3IWF 41 in FIG. 5 is changed to the gNB 32, and Steps S141 to S158 are similar to Steps S101 to S118 in FIG. 5. Accordingly, detailed description of the registration processing in FIG. 7 is omitted.

Figure 8:
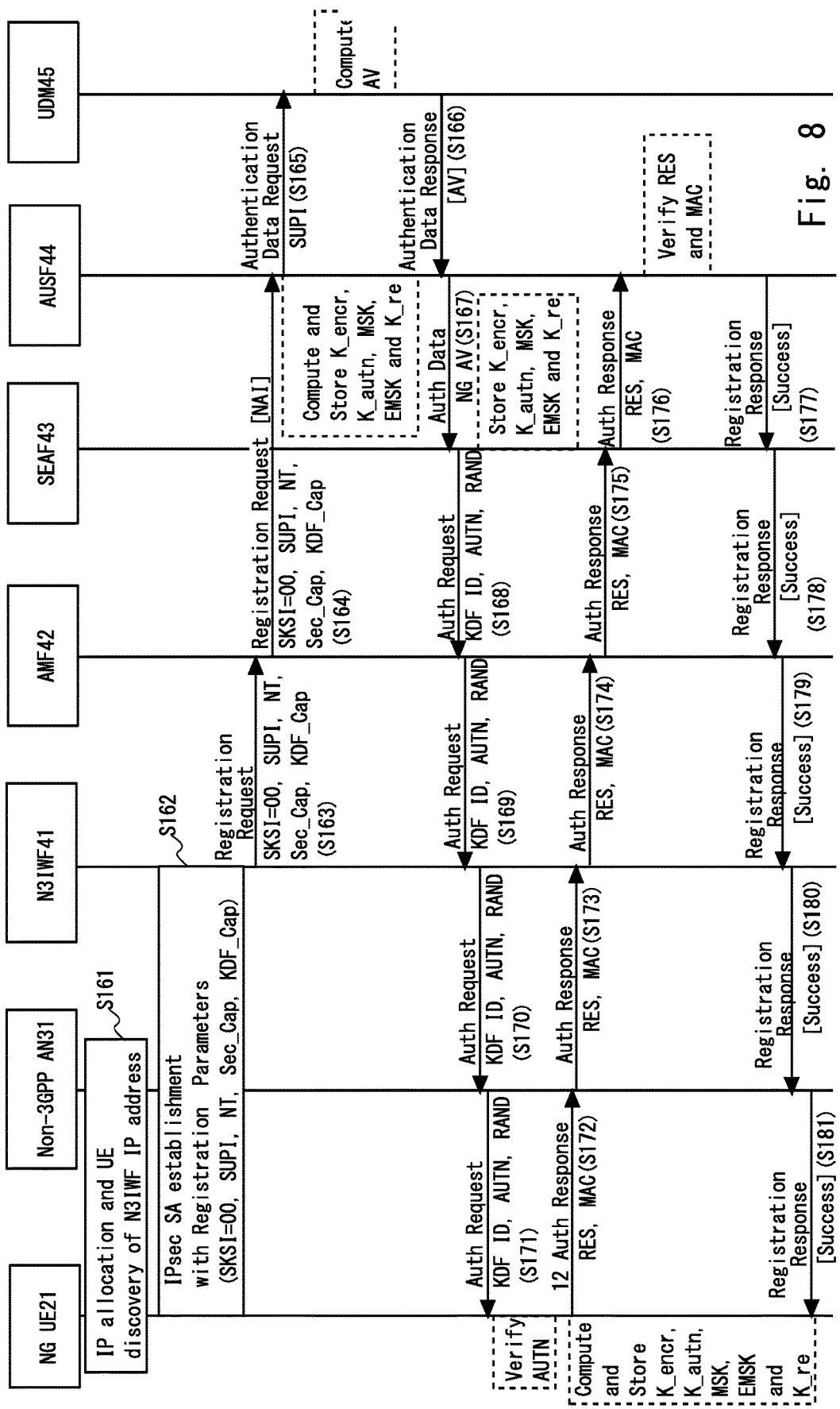
FIG. 8 is a diagram illustrating a flow of registration processing according to the second example embodiment.

Next, a flow of registration processing different from the registration processing in FIG. 2 to FIG. 7 will be described by use of FIG. 8.

The NG UE 21 connects to the non-3GPP AN 31 and acquires an IP address in Step S161. Additionally, when making a registration to a 5GC, the NG UE 21 discovers an IP address of the N3IWF 41 in a 5G public land mobile network (PLMN).

Next, the NG UE 21 establishes an IPsec security association (SA) with the N3IWF 41 in Step S162. For example, the NG UE 21 establishes an IPsec SA by initiating an Internet key exchange version 2 (IKEv2) signaling procedure. After establishment of the IPsec SA, protection related to encryption and integrity assurance is executed on every message from here onward. The NG UE 21 sends a registration request message to the N3IWF 41.

The registration request message includes an SKSI, a SUPI, an NT, a Sec_Cap, and a KDF_Cap. The SKSI included in the registration request message is set to SKSI=00. SKSI=00 indicates that the NG UE 21 does not hold a security context. For example, a security context may be a master session key (MSK).

For example, the SUPI may be a network access identifier (NAI) or an international mobile subscriber identity (IMSI). The NT indicates a more preferable access network used for transmission of the registration request message.

The Sec_Cap is used for initiating a security mode command (SMC) procedure after successful authentication processing. The KDF_Cap is accompanied by a pseudo random function used for derivation of a master key.

Steps S163 to S181 are similar to Steps S13 to S31 in FIG. 2, and therefore detailed description thereof is omitted.

Figure 9:
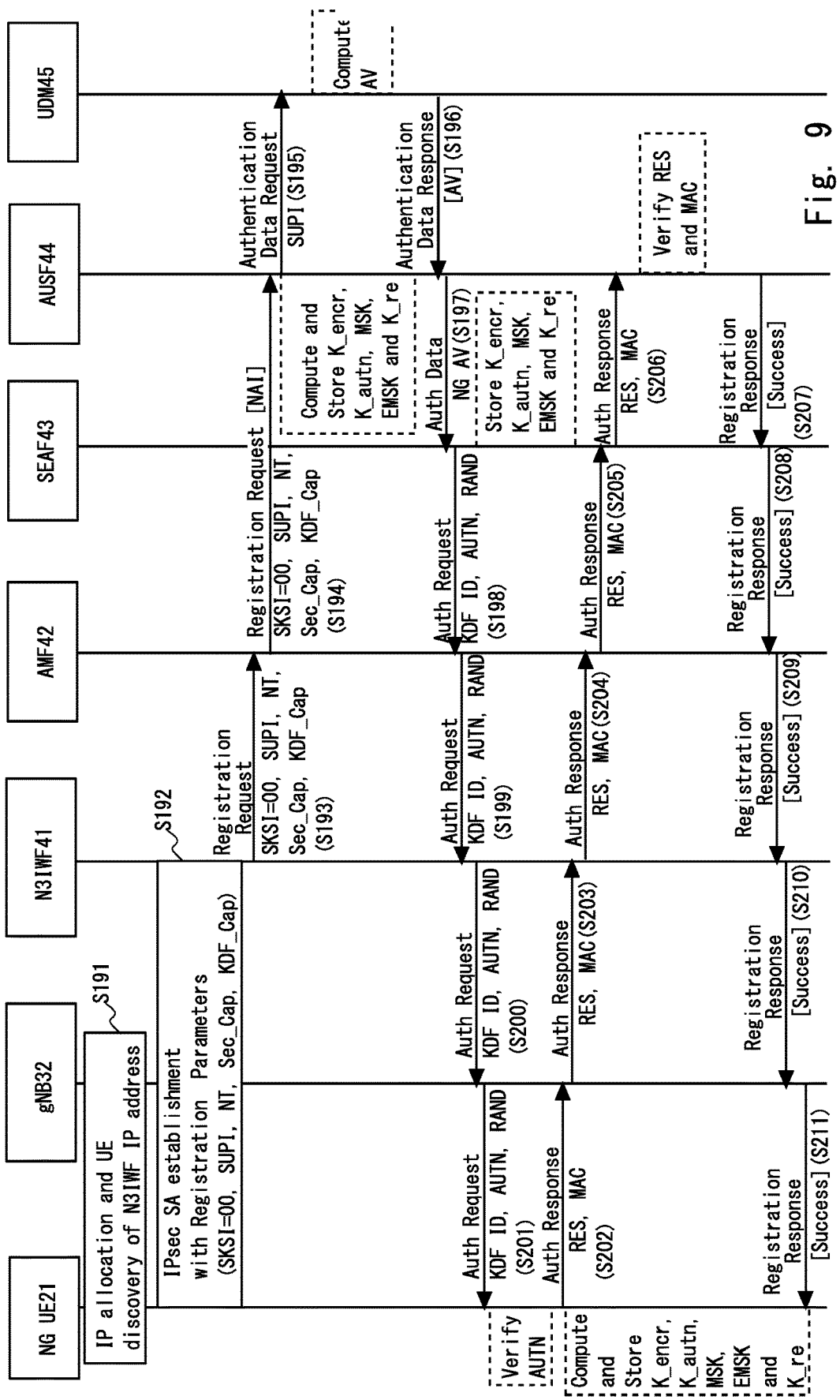
FIG. 9 is a diagram illustrating a flow of registration processing according to the second example embodiment.

Next, a flow of registration processing different from the registration processing in FIG. 2 to FIG. 8 will be described by use of FIG. 9. The only change in FIG. 9 is that the non-3GPP AN 31 in FIG. 8 is changed to the gNB 32, and Steps S191 to S211 are similar to Steps S161 to S181 in FIG. 8. Accordingly, detailed description of the registration processing in FIG. 9 is omitted.

Figure 10:
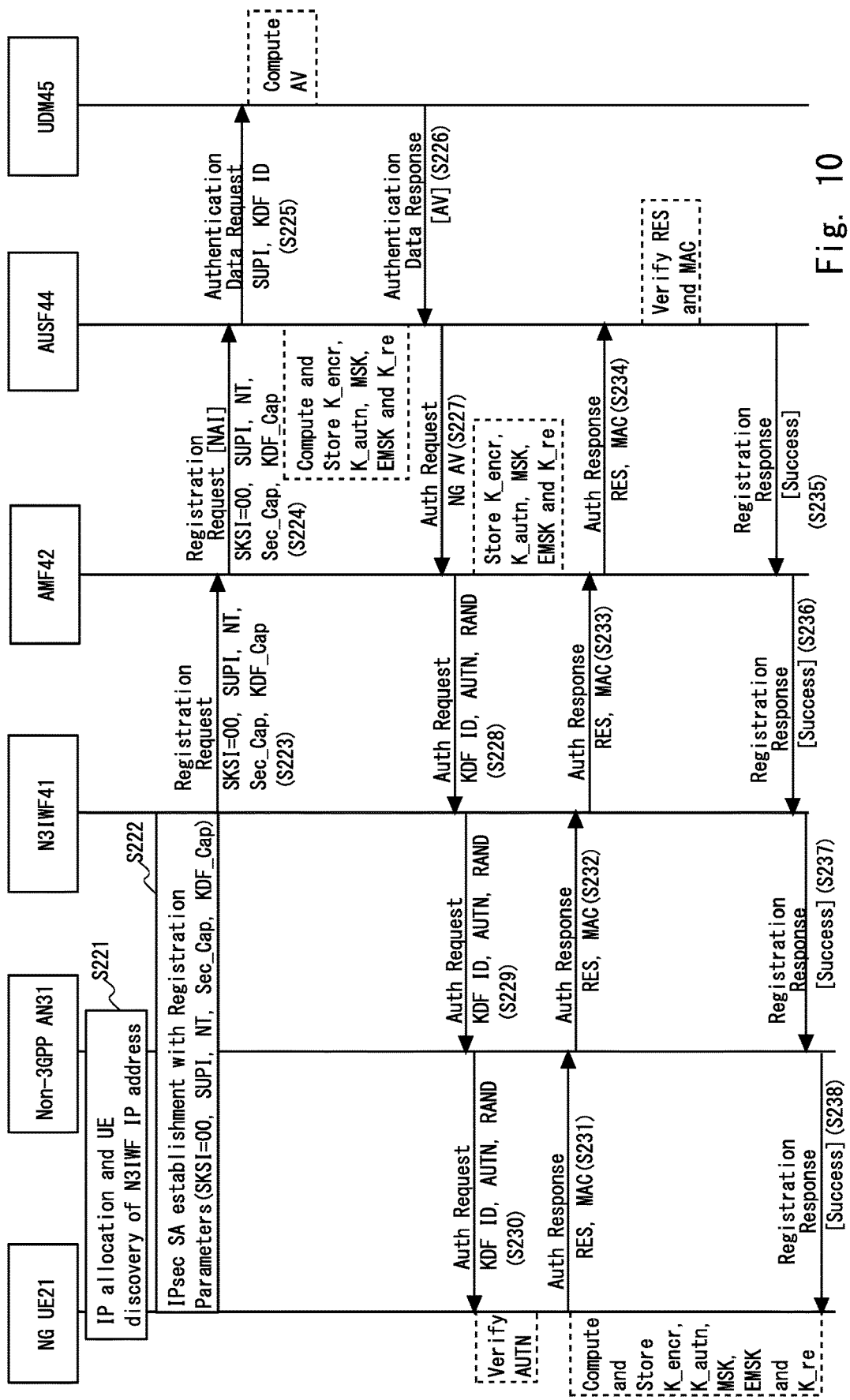
FIG. 10 is a diagram illustrating a flow of registration processing according to the second example embodiment.

Next, a flow of registration processing different from the registration processing in FIG. 2 to FIG. 9 will be described by use of FIG. 10. The processing in the SEAF 43 in FIG. 8 is executed in the AMF 42 in FIG. 10. Steps S221 to S238 are substantially similar to Steps S161 to S181 in FIG. 8. Accordingly, detailed description of the registration processing in FIG. 10 is omitted.

Figure 11:
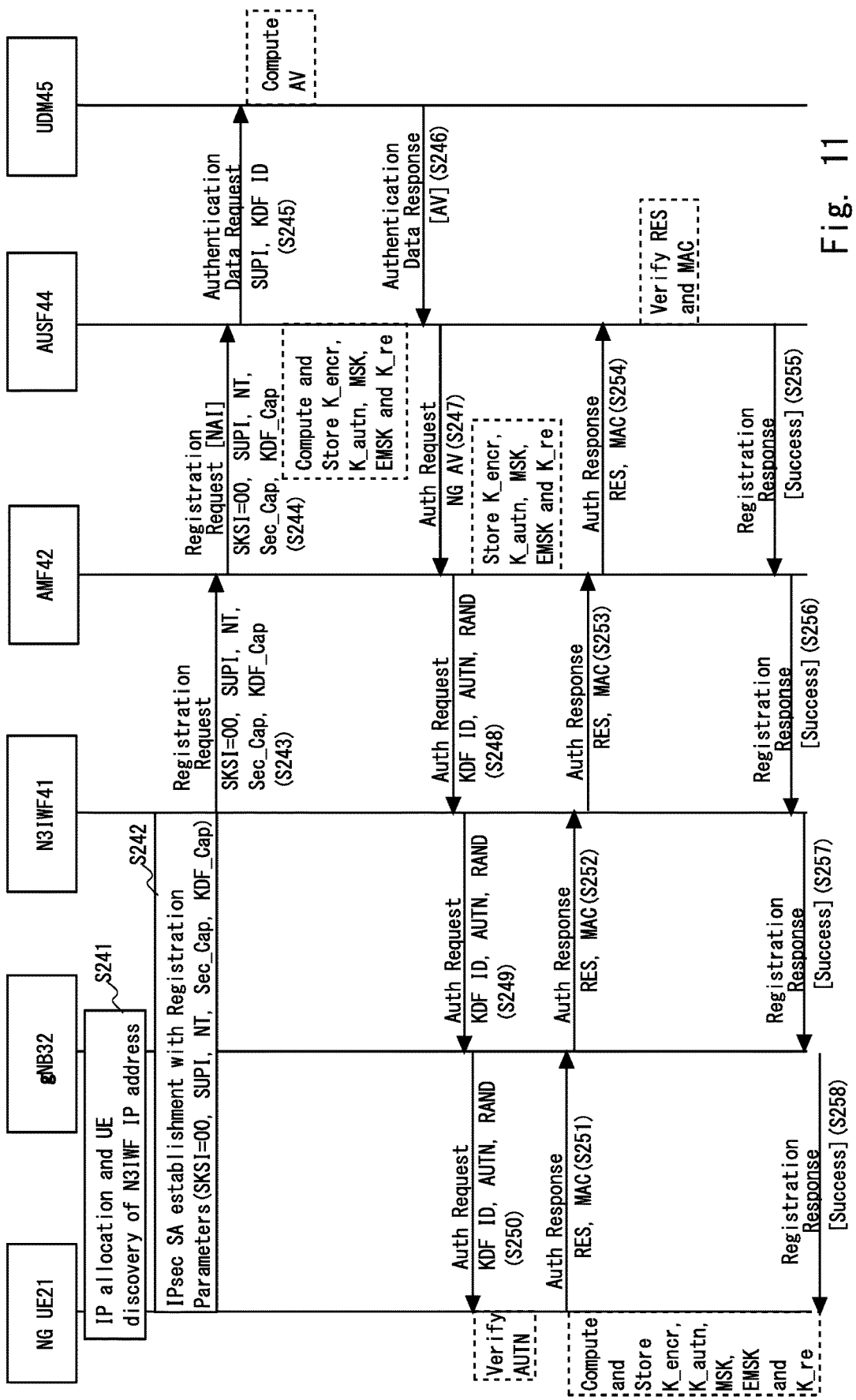
FIG. 11 is a diagram illustrating a flow of registration processing according to the second example embodiment.

Next, a flow of registration processing different from the registration processing in FIG. 2 to FIG. 10 will be described by use of FIG. 11. The only change in FIG. 11 is that the non-3GPP AN 31 in FIG. 10 is changed to the gNB 32, and Steps S241 to S258 are similar to Steps S221 to S238 in FIG. 10. Accordingly, detailed description of the registration processing in FIG. 11 is omitted.

Next, a flow of re-registration processing will be described by use of FIG. 12. First, the NG UE 21 sends a re-registration request message to the non-3GPP AN 31 (S261). The re-registration request message includes an SKSI, a temporary user identifier (TUID), a Sec_Cap, and an NT.

The SKSI included in the re-registration request message is set to SKSI=01. SKSI=01 indicates that a network, such as a 5GC, holds a security context. For example, the security context includes a used MSK, an unused EMSK, a K_encr, and a K_autn.

The TUID may be a temporary mobile subscriber identity (TMSI) or a globally unique MME identifier (GUTI). The Sec_Cap is an optional parameter sent only when a change is made.

Next, the non-3GPP AN 31 forwards the re-registration request message to the N3IWF 41 (S262). The non-3GPP AN 31 forwards the re-registration request message through an NG2 interface set between the non-3GPP AN 31 and the N3IWF 41. The N3IWF 41 enables registration of the NG UE 21 to the 5GC through the non-3GPP AN 31.

Next, the N3IWF 41 forwards the re-registration request message to the AMF 42 (S263).

The AMF 42 fetches a SUPI corresponding to the received TUID. The SUPI may be an IMSI. Additionally, the AMF 42 sends a re-registration data request message including the SUPI to the SEAF 43 (S264).

The SEAF 43 retrieves a security context and sends a re-registration data response message including the security context and a previously used AUTN to the AMF 42 (S265). The security context is derived during initial authentication processing. The security context includes an MSK, an EMSK, a K_encr, and a K_autn that correspond to a received UE identifier.

The AMF 42 keeps the received security context and generates a message related to MSK authentication as a proof of possession. The AMF 42 sends a re-authentication request message including the AUTN and a *MAC to the N3IWF 41 (S266).

Next, the N3IWF 41 sends the re-authentication request message related to the NG UE 21 to the non-3GPP AN 31 (S267). Next, the non-3GPP AN 31 sends the re-authentication request message to the NG UE 21 (S268).

Next, the NG UE 21 validates the AUTN and the *MAC in order to perform network authentication. When the validation is successful, the NG UE 21 generates a RES. Additionally, the NG UE 21 computes a MAC used as a proof of possession from the previously used MSK, K_encr, and K_autn. The NG UE 21 sends a re-authentication response message including the RES and the MAC to the non-3GPP AN 31 (S269).

Next, the non-3GPP AN 31 routes the re-authentication response message related to the AMF 42 to the N3IWF 41 (S270). Next, the N3IWF 41 forwards the re-authentication request message to the AMF 42 (S271).

Next, the AMF 42 verifies the MAC and the RES. When the verification of the MAC and the RES is successful, the AMF 42 sends a re-registration response message including a success message related to the NG UE 21 to the N3IWF 41 (S272).

Next, the N3IWF 41 routes the re-registration response message including the success message related to the NG UE 21 to the non-3GPP AN 31 (S273). Next, the non-3GPP AN 31 sends the re-registration response message to the NG UE 21 (S274).

Next, a flow of re-registration processing different from the re-registration processing in FIG. 12 will be described by use of FIG. 13. The only change in FIG. 13 is that the non-3GPP AN 31 in FIG. 12 is changed to the gNB 32, and Steps S281 to S294 are similar to Steps S261 to S274 in FIG. 12. Accordingly, detailed description of the re-registration processing in FIG. 13 is omitted.

Figure 13:
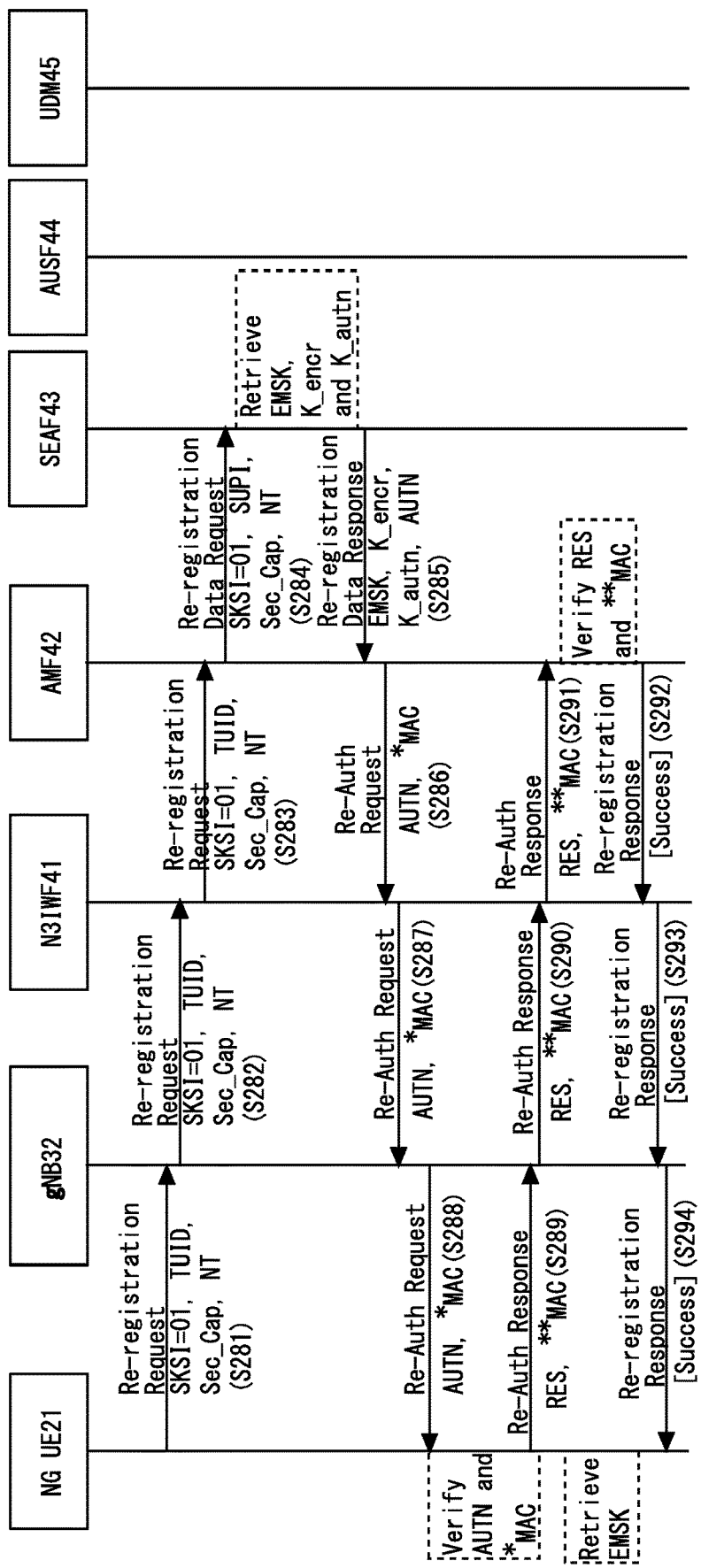
FIG. 13 is a diagram illustrating a flow of re-registration processing according to the second example embodiment.
Figure 14:
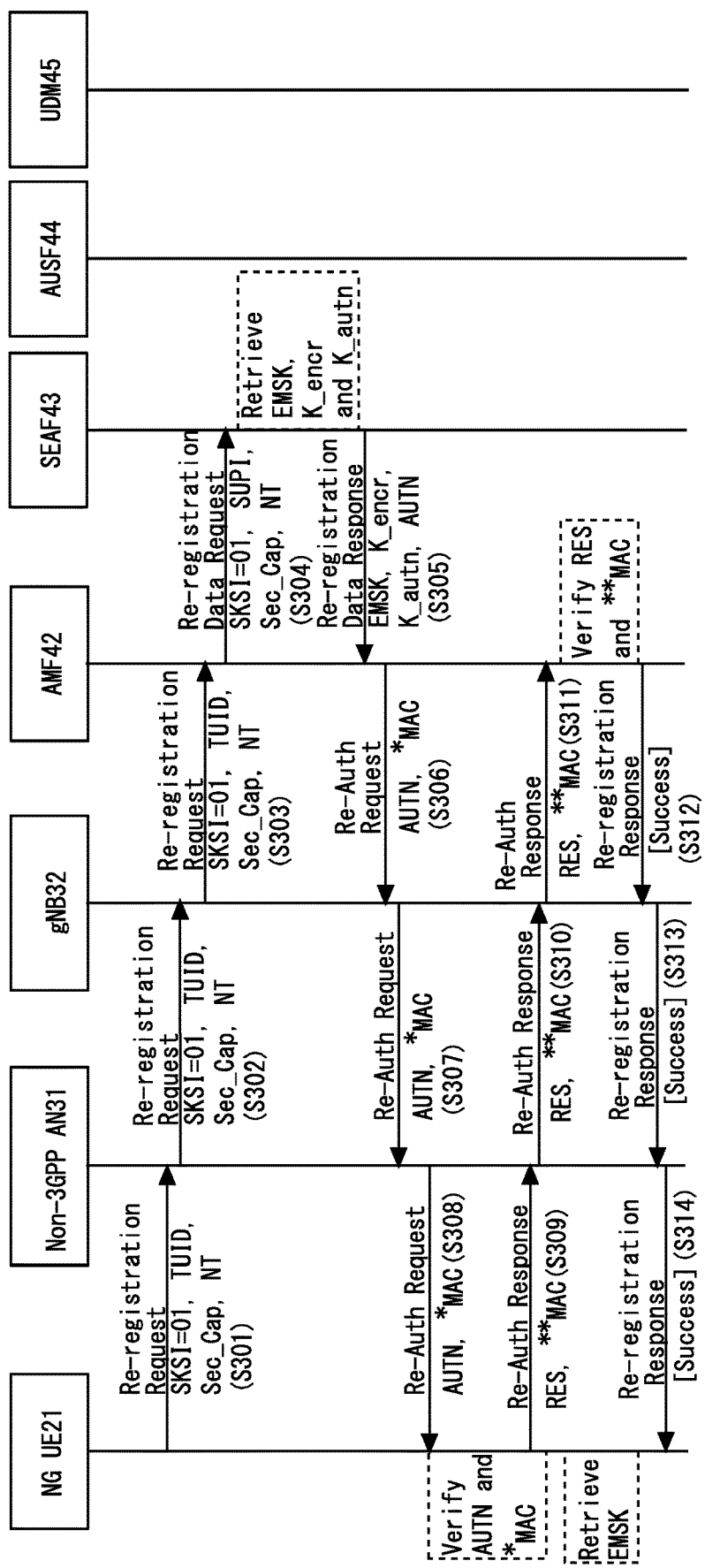
FIG. 14 is a diagram illustrating a flow of re-registration processing according to the second example embodiment.

Next, a flow of re-registration processing different from the re-registration processing in FIG. 12 and FIG. 13 will be described by use of FIG. 14. The only change in FIG. 14 is that the N3IWF 41 in FIG. 12 is changed to the gNB 32, and Steps S301 to S314 are similar to Steps S261 to S274 in FIG.

12. Accordingly, detailed description of the re-registration processing in FIG. 14 is omitted.

Figure 15:
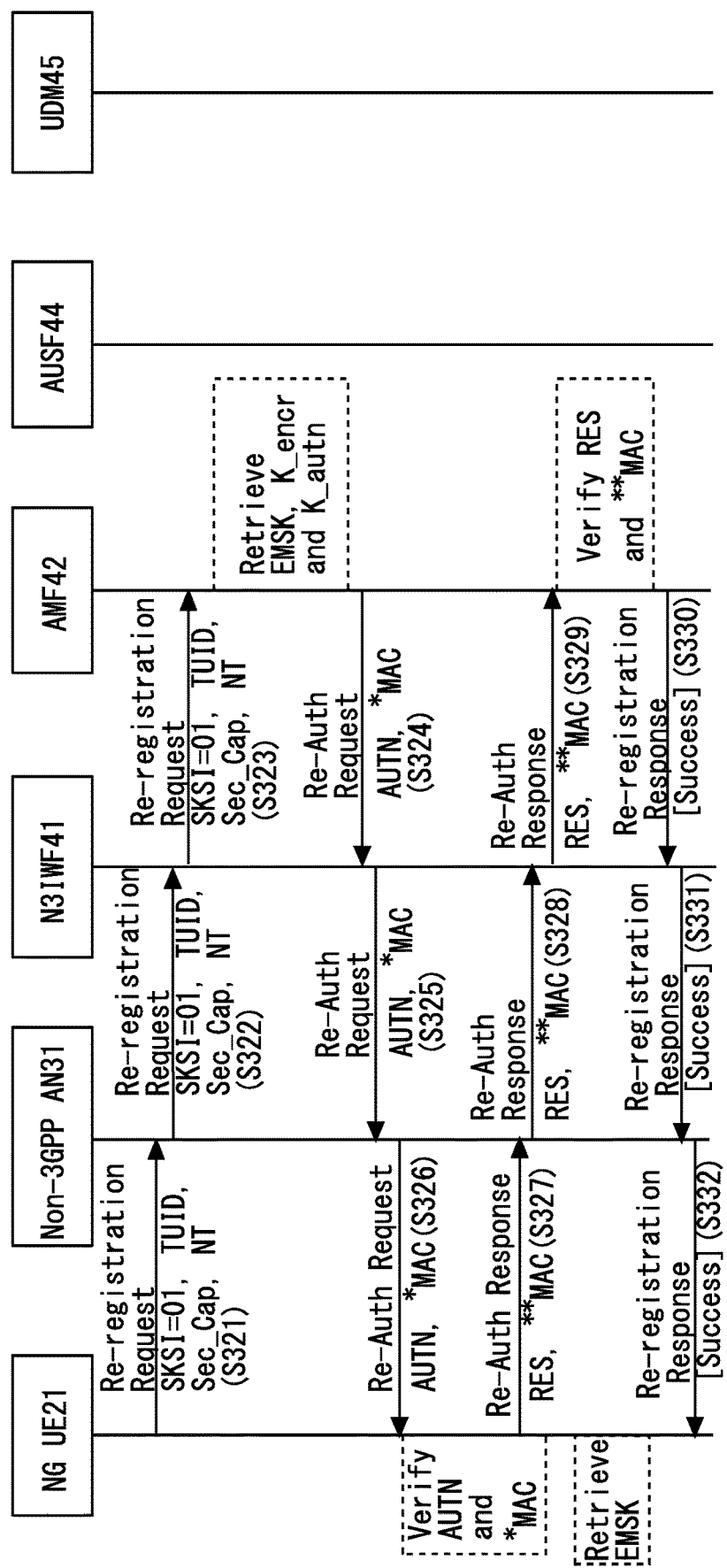
FIG. 15 is a diagram illustrating a flow of re-registration processing according to the second example embodiment.

Next, a flow of re-registration processing different from the re-registration processing in FIG. 12 to FIG. 14 will be described by use of FIG. 15. The processing in the SEAF 43 in FIG. 12 is executed in the AMF 42 in FIG. 15. Steps S321 to S332 are substantially similar to Steps S261 to S274 in FIG. 12. Accordingly, detailed description of the re-registration processing in FIG. 15 is omitted.

Figure 16:
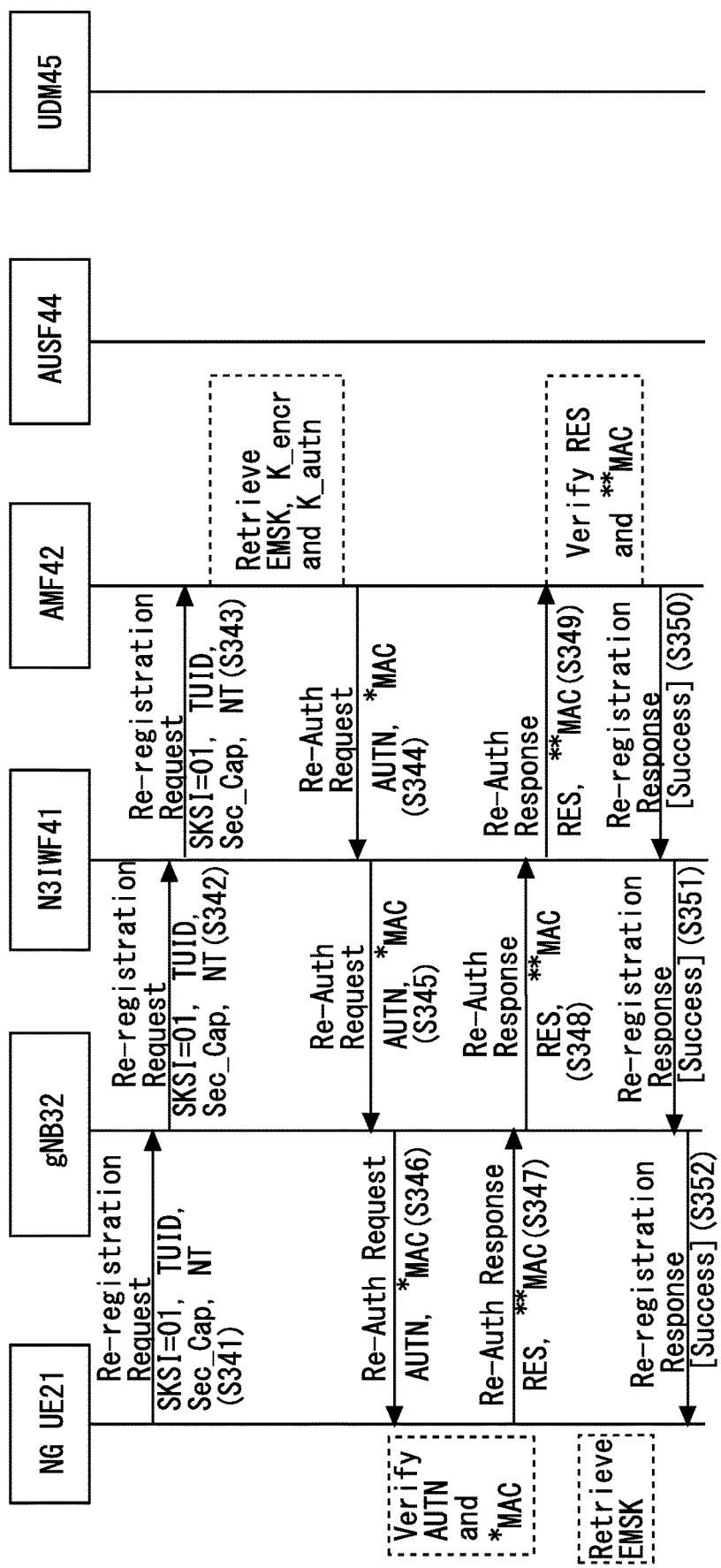
FIG. 16 is a diagram illustrating a flow of re-registration processing according to the second example embodiment.

Next, a flow of re-registration processing different from the re-registration processing in FIG. 12 to FIG. 15 will be described by use of FIG. 16. The only change in FIG. 16 is that the non-3GPP AN 31 in FIG. 15 is changed to the gNB 32, and Steps S341 to S352 are similar to Steps S321 to S332 in FIG. 15. Accordingly, detailed description of the re-registration processing in FIG. 16 is omitted.

Figure 17:
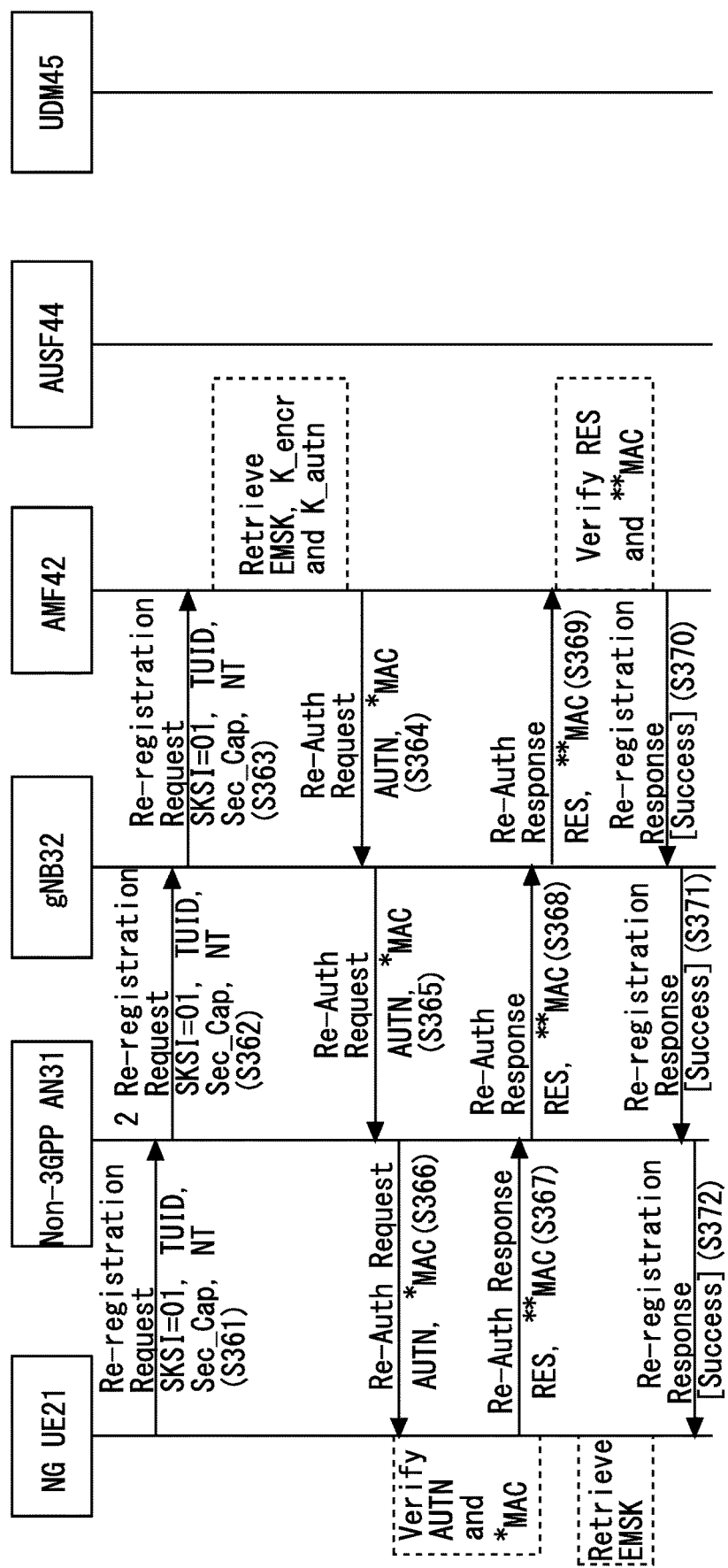
FIG. 17 is a diagram illustrating a flow of re-registration processing according to the second example embodiment.

Next, a flow of re-registration processing different from the re-registration processing in FIG. 12 to FIG. 16 will be described by use of FIG. 17. The only change in FIG. 17 is that the N3IWF 41 in FIG. 15 is changed to the gNB 32, and Steps S361 to S372 are similar to Steps S321 to S332 in FIG. 15. Accordingly, detailed description of the re-registration processing in FIG. 17 is omitted.

Figure 18:
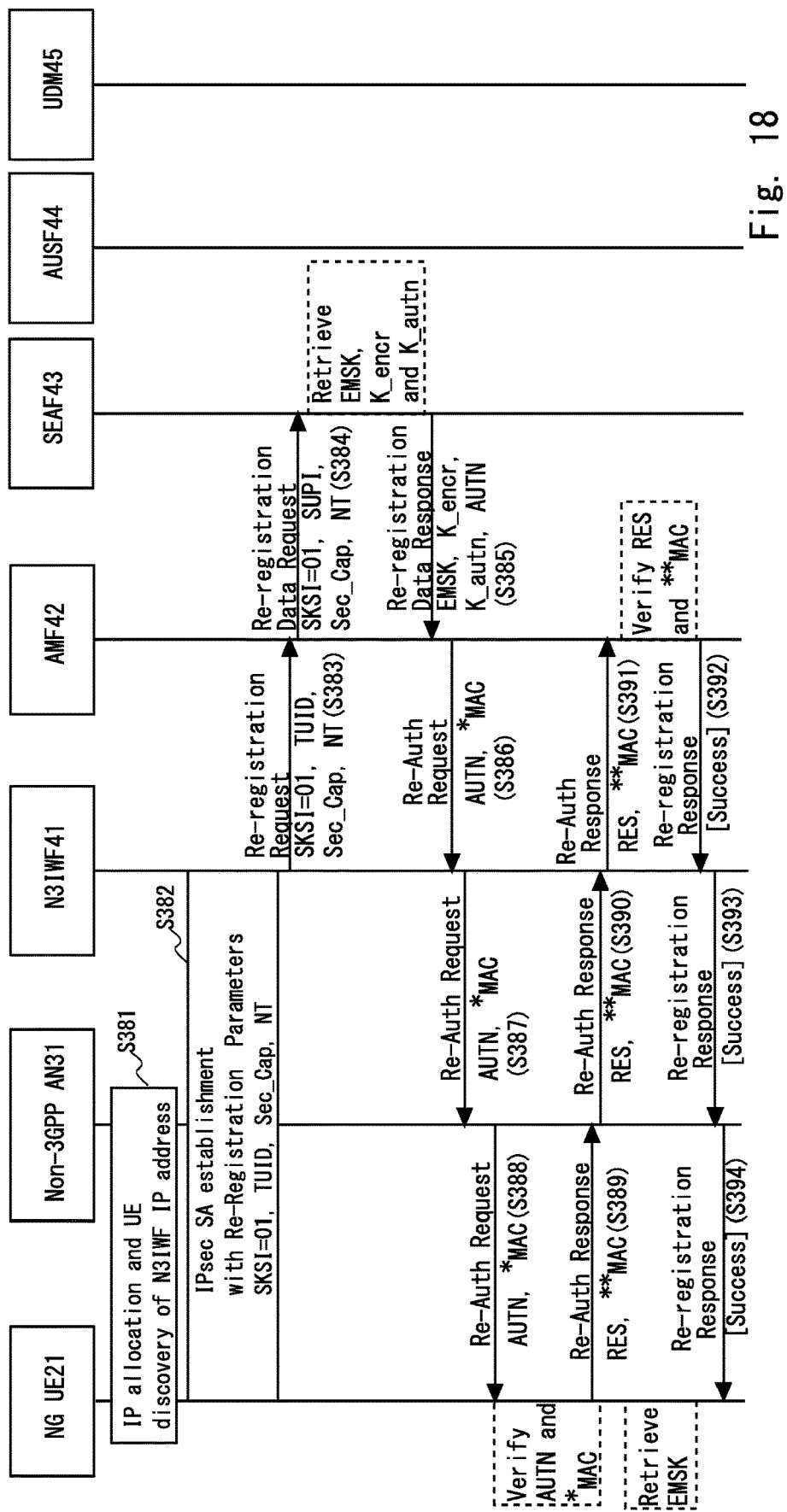
FIG. 18 is a diagram illustrating a flow of re-registration processing according to the second example embodiment.

Next, a flow of re-registration processing different from the re-registration processing in FIG. 12 to FIG. 17 will be described by use of FIG. 18.

The NG UE 21 connects to the non-3GPP AN 31 and acquires an IP address in Step S381. Additionally, when making a registration to a 5GC, the NG UE 21 discovers an IP address of the N3IWF 41 in a 5G public land mobile network (PLMN).

Next, the NG UE 21 establishes an IPsec security association (SA) with the N3IWF 41 in Step S382. For example, the NG UE 21 establishes an IPsec SA by initiating an Internet key exchange version 2 (IKEv2) signaling procedure. After establishment of the IPsec SA, protection related to encryption and integrity assurance is executed on every message from here onward. The NG UE 21 sends a re-registration request message to the N3IWF 41.

The re-registration request message includes an SKSI, a TUID, an NT, and a Sec_Cap. The SKSI included in the re-registration request message is set to SKSI=01. SKSI=01 indicates that the NG UE 21 holds a security context. For example, the security context may include a used MSK, an unused EMSK, a K_encr, and a K_autn. The TUID may be a temporary mobile subscriber identity (TMSI) or a globally unique MME identifier (GUTI). The Sec_Cap is an optional parameter sent only when a change is made.

Figure 12:
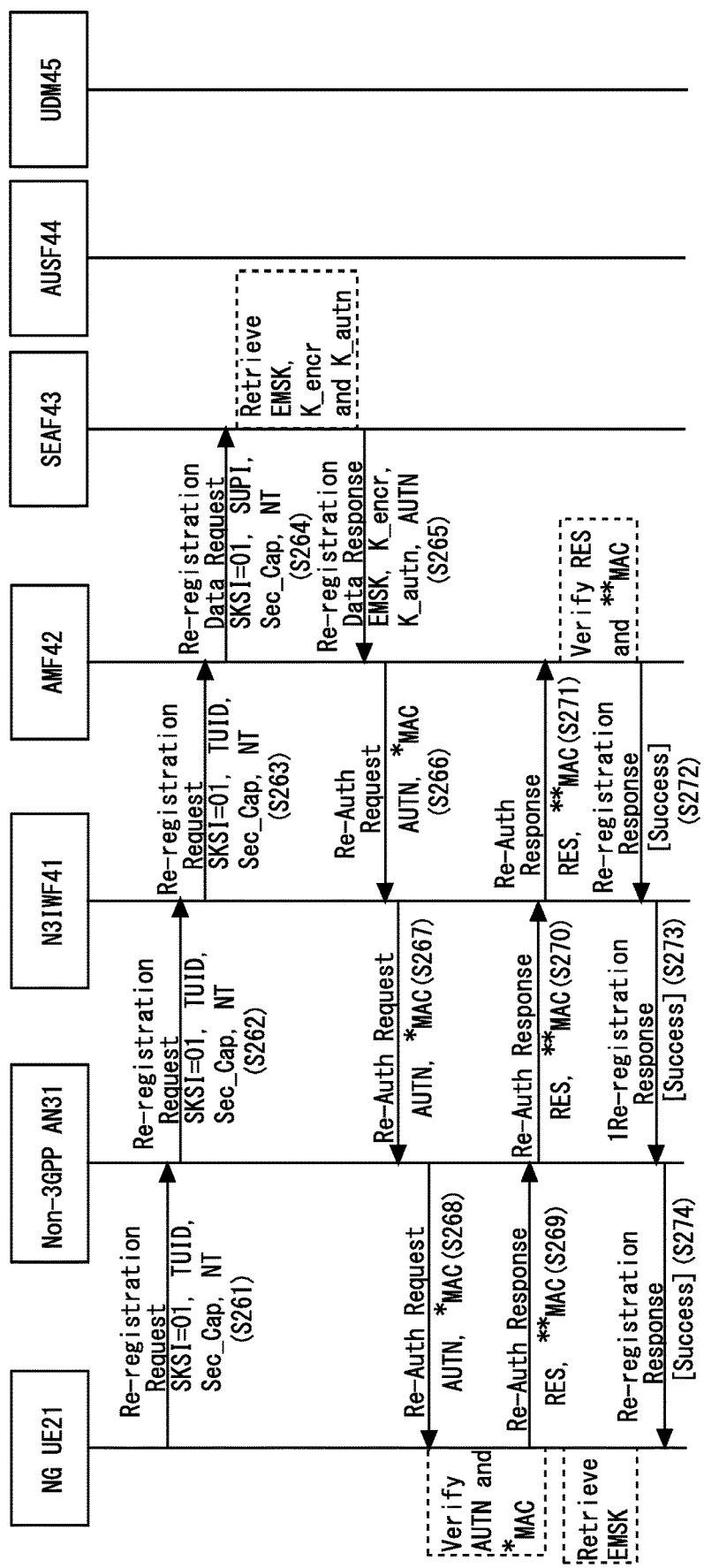
FIG. 12 is a diagram illustrating a flow of re-registration processing according to the second example embodiment.

Steps S383 to S394 are similar to Steps S263 to S274 in FIG. 12, and therefore detailed description thereof is omitted.

Figure 19:
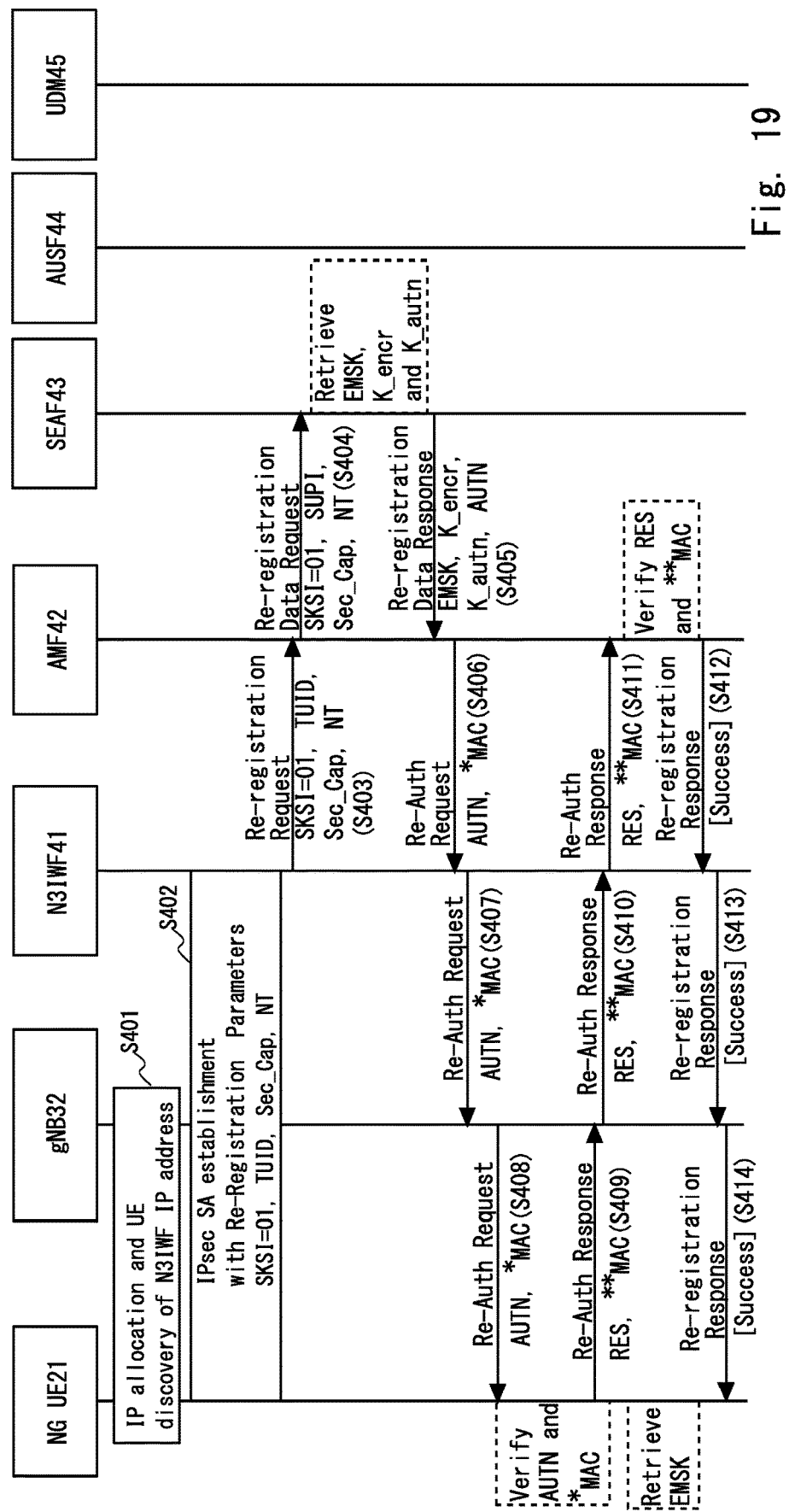
FIG. 19 is a diagram illustrating a flow of re-registration processing according to the second example embodiment.

Next, a flow of re-registration processing different from the re-registration processing in FIG. 12 to FIG. 18 will be described by use of FIG. 19. The only change in FIG. 19 is that the non-3GPP AN 31 in FIG. 18 is changed to the gNB 32, and Steps S401 to S414 are similar to Steps S381 to S394 in FIG. 18. Accordingly, detailed description of the re-registration processing in FIG. 19 is omitted.

Figure 20:
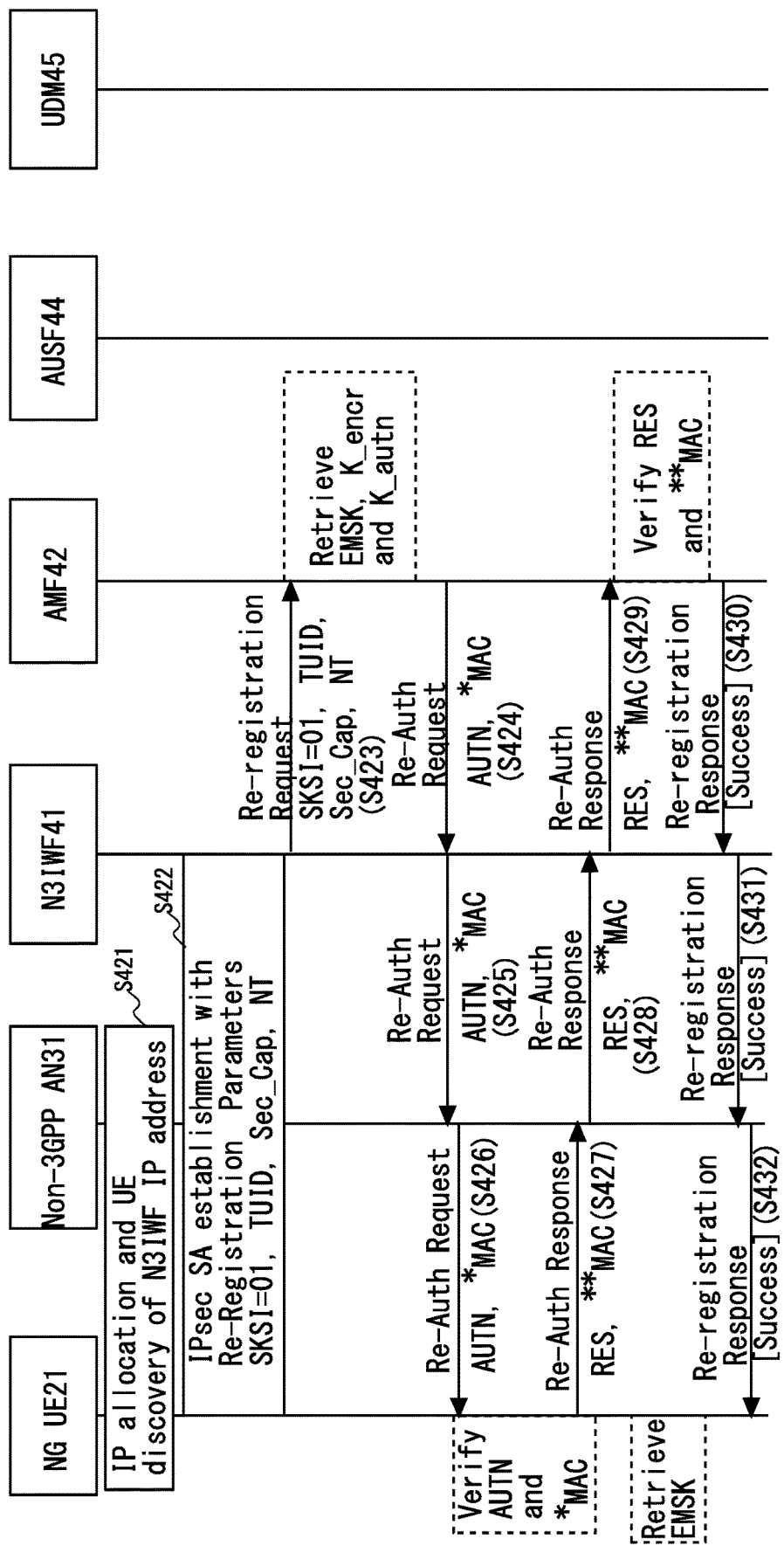
FIG. 20 is a diagram illustrating a flow of re-registration processing according to the second example embodiment.

Next, a flow of re-registration processing different from the re-registration processing in FIG. 12 to FIG. 19 will be described by use of FIG. 20. The processing in the SEAF 43 in FIG. 18 is executed in the AMF 42 in FIG. 20. Steps S421 to S432 are substantially similar to Steps S381 to S394 in FIG. 18. Accordingly, detailed description of the re-registration processing in FIG. 20 is omitted.

Figure 21:
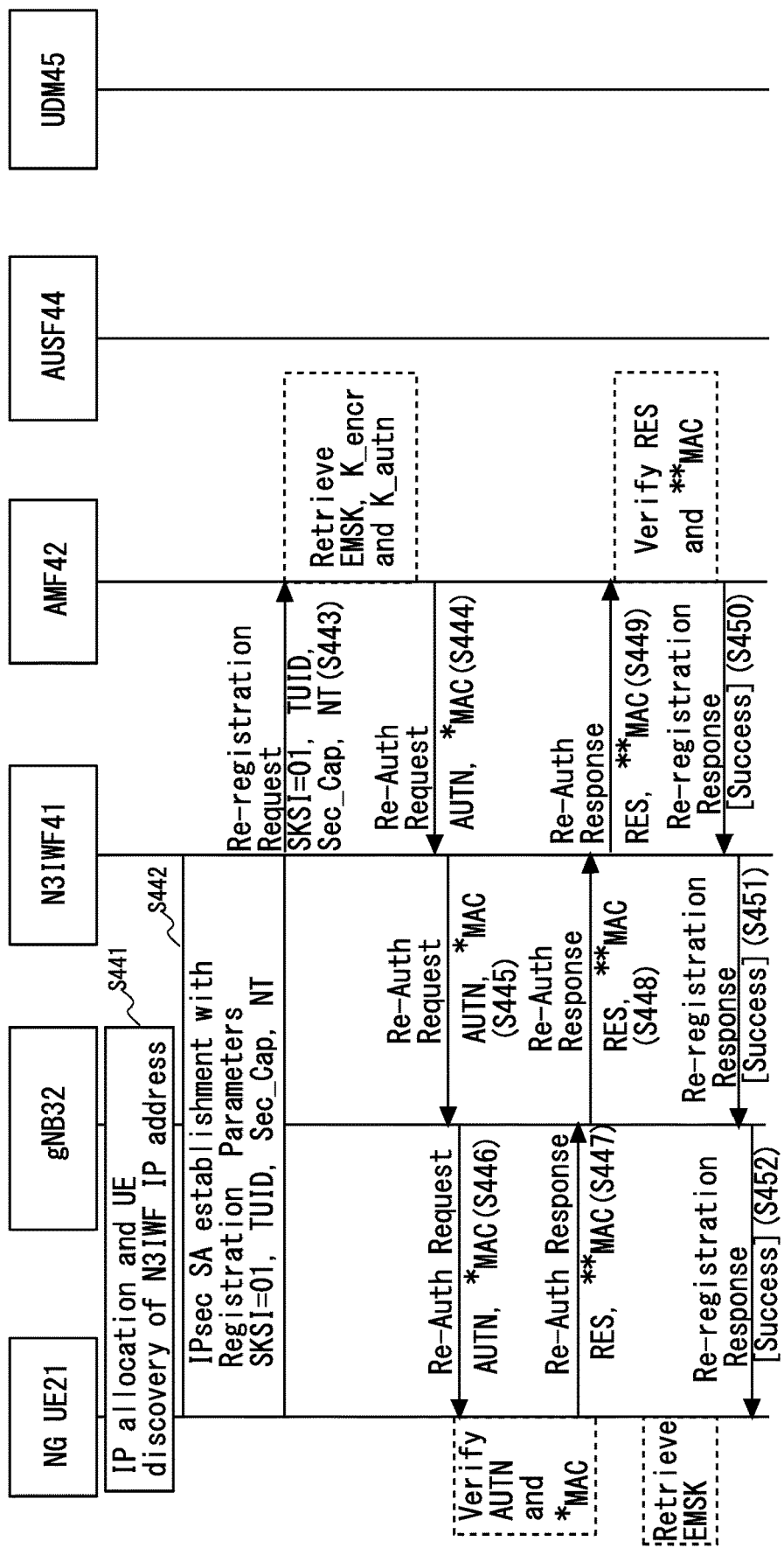
FIG. 21 is a diagram illustrating a flow of re-registration processing according to the second example embodiment.

Next, a flow of re-registration processing different from the re-registration processing in FIG. 12 to FIG. 20 will be described by use of FIG. 21. The only change in FIG. 21 is that the non-3GPP AN 31 in FIG. 20 is changed to the gNB 32, and Steps S441 to S452 are similar to Steps S421 to S432 in FIG. 20. Accordingly, detailed description of the re-registration processing in FIG. 21 is omitted.

Figure 22:
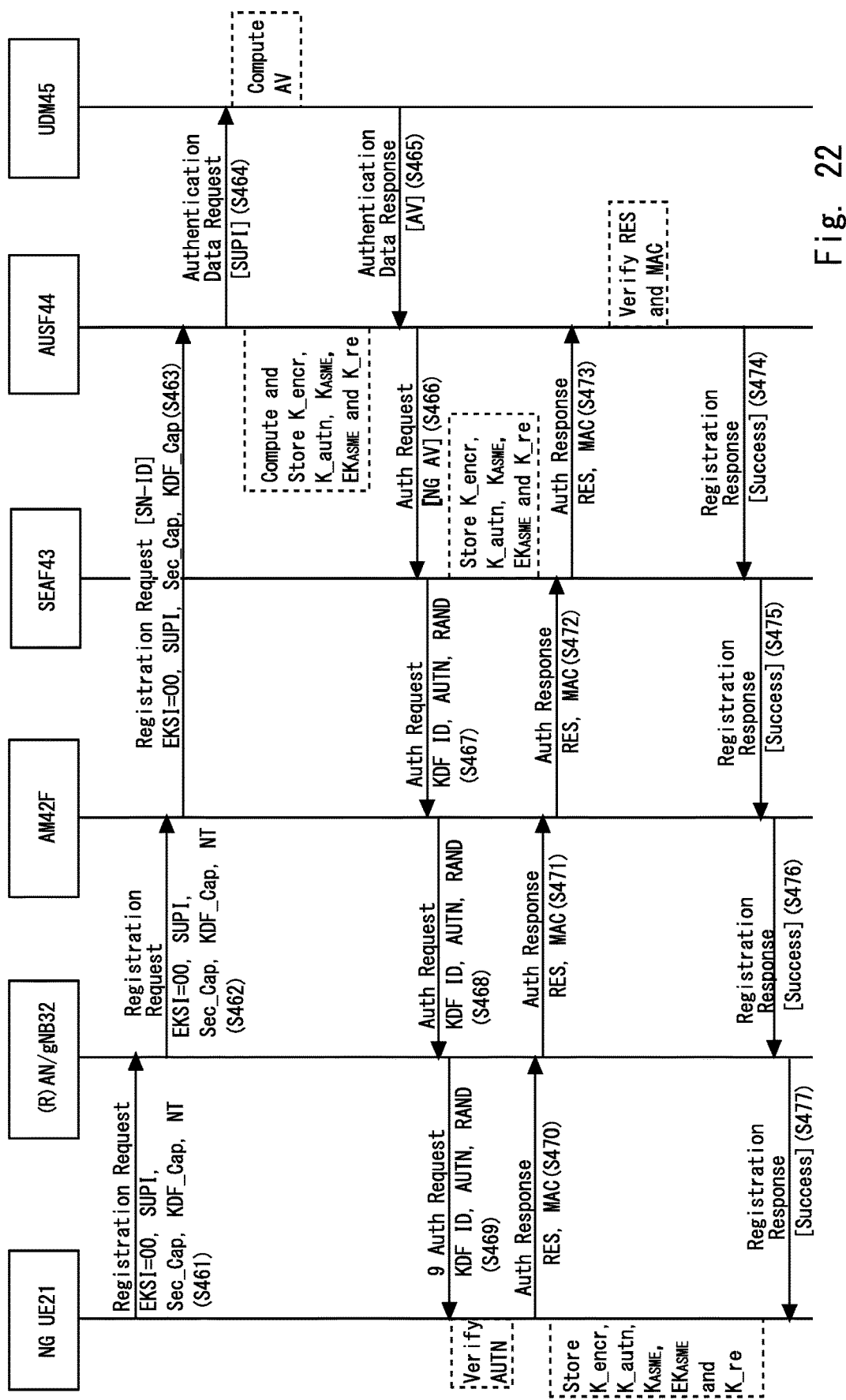
FIG. 22 is a diagram illustrating a flow of registration processing according to the second example embodiment.

Next, a flow of registration processing in a 3GPP AN according to the second example embodiment will be described by use of FIG. 22. The 3GPP AN is an access network using a communication mode for which a standard is set in the 3GPP. An (R)AN/gNB 32 in FIG. 22 indicates that the gNB 32 is placed in a 3GPP AN. The (R)AN/gNB 32 is described as a gNB 32 in the following description.

First, the NG UE 21 sends a registration request message to the gNB 32 (S461). The registration request message includes an E-UTRAN key set identifier (EKSI), a SUPI, an NT, a Sec_Cap, and a KDF_Cap.

The EKSI included in the registration request message is set to EKSI=00. EKSI=00 indicates that the NG UE 21 does not hold a security context.

For example, the SUPI may be an NAI or an IMSI. The NT indicates a more preferable access network used for transmission of the registration request message.

The Sec_Cap is used for initiating a security mode command (SMC) procedure after successful authentication processing. The KDF_Cap is accompanied by a pseudo random function used for derivation of a master key.

Next, the gNB 32 forwards the registration request message to the AMF 42 (S462).

The AMF 42 fetches a serving network identifier (SN-ID) from the SUPI. Additionally, the AMF 42 sends the registration request message to the AUSF 44 along with the SN-ID (S463). Next, the AUSF 44 validates the SN-ID and verifies whether or not the NG UE 21 is authorized to use the SN-ID. When the verification is successful, the AUSF 44 sends an authentication data request message to the UDM 45 along with the SUPI (S464). The AUSF 44 selects a pseudo random function, based on a preference of the AUSF 44 and the KDF_Cap.

Next, the UDM 45 generates an AV by use of an AMF separation bit 1. Additionally, the UDM 45 sends an authentication data response message including the AV to the AUSF 44 (S465). The AV includes a random number (RAND), a network authentication parameter (AUTN), an expected response (XRES), a cipher key (CK), and an integrity key (IK).

Next, the AUSF 44 generates a master key from the CK, the IK, a secret key K, and an access network identifier with the selected PRF according to Step S464. Additionally, the AUSF 44 extracts, from the master key, a confidentiality key (K_encr), an integrity key (K_autn), a $K_{ASME}$, an extended $K_{ASME}$ ($EK_{ASME}$), and a re-authentication key (K_re). Additionally, the AUSF 44 generates an NG AV from each derived key and the received AV. The AUSF 44 sends an authentication request message including the NG AV to the SEAF 43 (S466). The NG AV includes the AV, a pseudo random function ID (PRF ID), the K_encr, the K_autn, the $K_{ASME}$, the $EK_{ASME}$, and the K_re.

Next, the SEAF 43 keeps the NG AV. Additionally, the SEAF 43 sends an authentication request message related to the NG UE 21 to the AMF 42 (S467). The authentication request message includes a RAND, an AUTN, and a KDF ID. The KDF ID indicates a PRF selected for derivation of the master key.

Next, the AMF 42 sends the authentication request message related to the NG UE 21 to the gNB 32 (S468). Next, the gNB 32 forwards the authentication request message to the NG UE 21 (S469).

Next, the NG UE 21 validates the received AUTN value in order to perform network authentication. When the validation is successful, the NG UE 21 computes a master key and session key materials by use of the PRF notified in the authentication request message. The session key materials include a K_encr, a K_autn, a $K_{ASME}$, an $EK_{ASME}$, and a K_re. The K_encr and the K_autn are used in computation of a message authentication code (MAC). When the MAC computation is successful, the NG UE 21 sends an authentication response message related to the AUSF 44 to the gNB 32 (S470). The authentication response message includes a RES and the MAC.

Next, the gNB 32 routes the authentication response message related to the AUSF 44 to the AMF 42 (S471). Next, the AMF 42 routes the authentication response message related to the AUSF 44 to the SEAF 43 (S472). Next, the SEAF 43 routes the authentication response message to the AUSF 44 (S473).

Next, the AUSF 44 validates the MAC. Additionally, the AUSF 44 compares the received RES with the XRES. When verification of the MAC and the RES is successful, the AUSF 44 sends a registration response message including a success message related to the NG UE 21 to the SEAF 43 (S474). Next, the SEAF 43 sends the registration response message including the success message related to the NG UE 21 to the AMF 42 (S475). Next, the AMF 42 sends the registration response message including the success message related to the NG UE 21 to the gNB 32 (S476). Next, the gNB 32 sends the registration response message including the success message to the NG UE 21 (S477).

Figure 23:
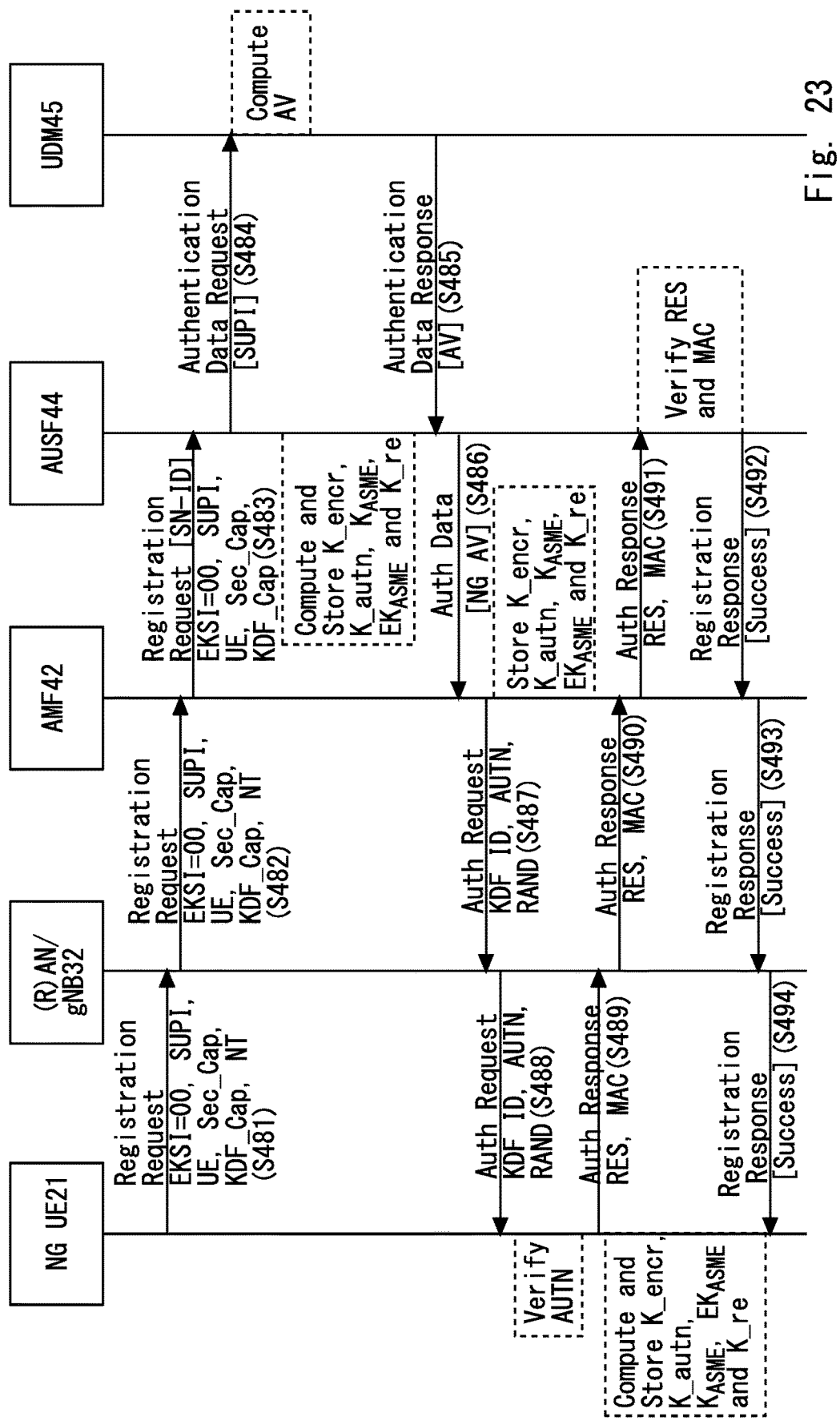
FIG. 23 is a diagram illustrating a flow of registration processing according to the second example embodiment.

Next, a flow of registration processing different from the registration processing in FIG. 22 will be described by use of FIG. 23. The processing in the SEAF 43 in FIG. 22 is executed in the AMF 42 in FIG. 23. Steps S481 to S494 are substantially similar to Steps S461 to S477 in FIG. 22. Accordingly, detailed description of the re-registration processing in FIG. 23 is omitted.

Figure 24:
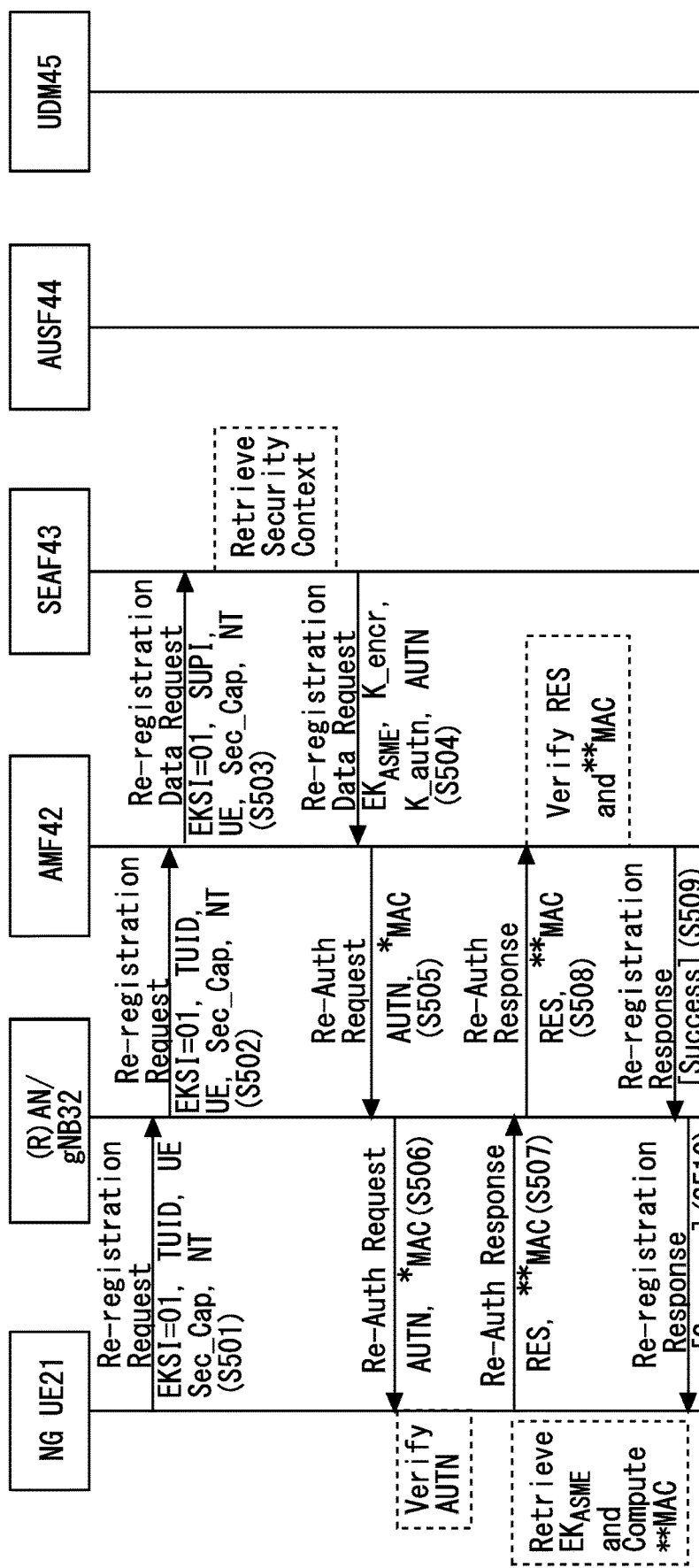
FIG. 24 is a diagram illustrating a flow of re-registration processing according to the second example embodiment.

Next, a flow of re-registration processing in the 3GPP AN according to the second example embodiment will be described by use of FIG. 24.

First, the NG UE 21 sends a re-registration request message to the gNB 32 (S501). The registration request message includes an E-UTRAN key set identifier (EKSI), a TUID, an NT, and a Sec_Cap.

The EKSI included in the registration request message is set to EKSI=01. EKSI=01 indicates that the NG UE 21 holds a security context. For example, the security context includes a K_encr, a K_autn, a used $K_{ASME}$, and an unused $EK_{ASME}$.

The TUID may be a temporary mobile subscriber identity (TMSI) or a globally unique MME identifier (GUTI). The Sec_Cap is an optional parameter sent only when a change is made.

Next, the gNB 32 forwards the re-registration request message to the AMF 42 (S502).

The AMF 42 fetches a SUPI corresponding to the received TUID. For example, the SUPI may be an IMSI. Additionally, the AMF 42 sends the registration request message to the SEAF 43 along with the SUPI (S503).

The SEAF 43 retrieves a security context and sends a re-registration data response message including the security context and a previously used AUTN to the AMF 42 (S504). The security context is derived during initial authentication processing. The security context includes a K_encr, a K_autn, a $K_{ASME}$, an $EK_{ASME}$, and a K_re.

The AMF 42 keeps the received security context and generates a MAC as a proof of possession by use of the $K_{ASME}$. The AMF 42 sends a re-authentication request message including the AUTN and a *MAC to the gNB 32 (S505).

Next, the gNB 32 sends the re-authentication request message to the NG UE 21 (S506).

Next, the NG UE 21 validates the AUTN and the *MAC in order to perform network authentication. When the validation is successful, the NG UE 21 generates a RES. Additionally, the NG UE 21 computes a MAC used as a proof of possession from the previously used $K_{ASME}$, K_encr, and K_autn. The NG UE 21 sends a re-authentication response message including the RES and the MAC to the gNB 32 (S507).

Next, the gNB 32 forwards the re-authentication response message to the AMF 42 (S508).

Next, the AMF 42 verifies the MAC and the RES. When the verification of the MAC and the RES is successful, the AMF 42 sends a re-registration response message including a success message related to the NG UE 21 to the gNB 32 (S509).

Next, the gNB 32 sends the re-registration response message including the success message related to the NG UE 21 to the NG UE 21 (S510).

Figure 25:
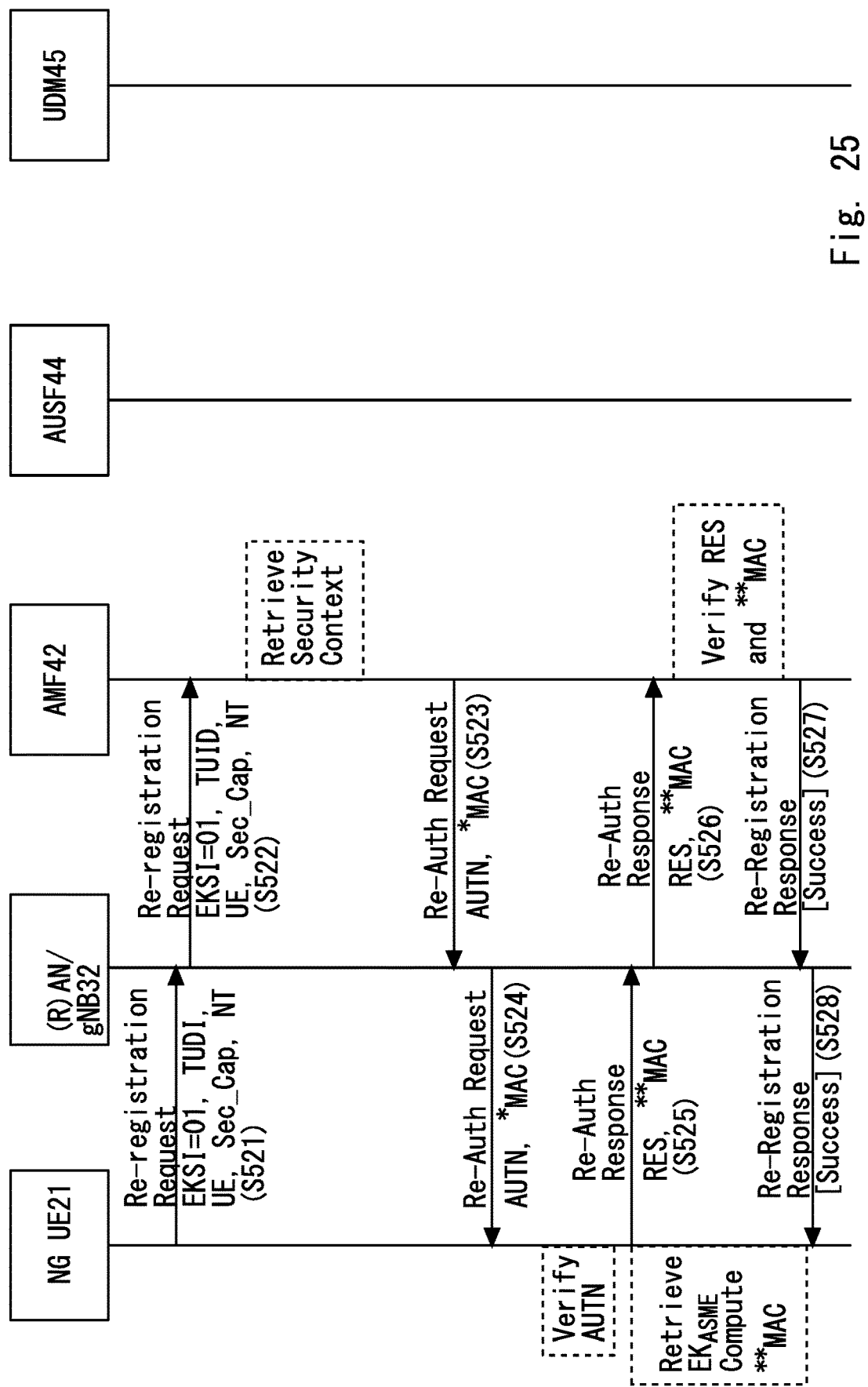
FIG. 25 is a diagram illustrating a flow of re-registration processing according to the second example embodiment.

Next, a flow of re-registration processing different from the re-registration processing in FIG. 24 will be described by use of FIG. 25. The processing in the SEAF 43 in FIG. 24 is executed in the AMF 42 in FIG. 25. Steps S521 to S528 are substantially similar to Steps S501 to S510 in FIG. 24. Accordingly, detailed description of the re-registration processing in FIG. 25 is omitted.

As described above, a 5GC can normally perform registration processing and re-registration processing related to an NG UE 21 positioned in a 3GPP AN or a Non-3GPP AN.

Figure 26:
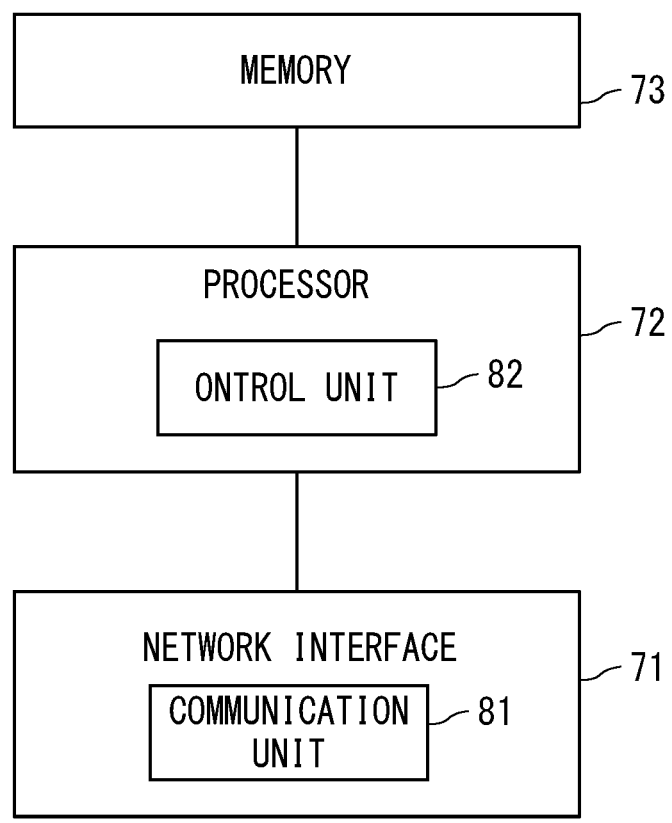
FIG. 26 is a configuration diagram of an authentication device and a network device, according to each example embodiment.

Next, a configuration example of an authentication device 10 and a network device 40 will be described by use of FIG. 26. For example, the authentication device 10 may be an AUSF 44. The network device 40 may be an AMF 42 or a SEAF 43.

Each of the authentication device 10 and the network device 40 includes a network interface 71, a processor 72, and a memory 73. The network interface 71 includes a communication unit 81, and the processor 72 includes a control unit 82.

For example, the network interface 71 communicates with another device. Additionally, the network interface 71 may include a baseband processor performing digital baseband signal processing. The network interface 71 sends or receives a message described in FIG. 2 to FIG. 25.

The processor 72 reads software (a computer program) from the memory 73 and executes the processing described in FIG. 2 to FIG. 25. For example, the processor 72 may be a microprocessor, a micro processing unit (MPU), or a central processing unit (CPU). The processor 72 may include a plurality of processors.

The memory 73 is composed of a combination of a volatile memory and a nonvolatile memory. The memory 73 may include a storage placed apart from the processor 72. In this case, the processor 72 may access the memory 73 through an unillustrated I/O interface.

The memory 73 is used for storing software or a software module group. The processor 72 reads the software or the software module group from the memory 73 and executes the software or the software module group. For example, the memory 73 may store a security key generated by the processor 72.

Further, the authentication device 10 executes an authentication method of, in registration processing of user equipment (UE), acquiring UE key derivation function (KDF) capabilities indicating a pseudo random function supported by the UE, selecting a pseudo random function used for generation of a master key related to the UE by use of the UE KDF capabilities, and generating a master key related to the UE by use of the selected pseudo random function.

Furthermore, the network device 40 executes an authentication method of, in registration processing of a UE, acquiring authentication information generated based on a master key generated by use of a pseudo random function supported by a UE indicated in UE KDF capabilities, storing the authentication information, and in re-registration processing of the UE, sending the stored authentication information in response to a message requesting authentication information.

In the aforementioned example, a program may be stored by use of various types of non-transitory computer readable media and be provided for a computer. Non-transitory computer readable media include various types of tangible storage media. Examples of a non-transitory computer readable media include magnetic storage media (for example, a flexible disk, a magnetic tape, and a hard disk drive), magneto-optical storage media (for example, a magneto-optical disk). Additionally, examples of non-transitory computer readable media include a CD-read only memory (ROM), a CD-R, and a CD-R/W. Furthermore, examples of non-transitory computer readable media include semiconductor memories. For example, semiconductor memories include a mask ROM, a programmable ROM (PROM), an erasable PROM (EPROM), a flash ROM, and a random access memory (RAM). Further, a program may be provided for a computer by various types of transitory computer readable media. Examples of transitory computer readable media include an electric signal, an optical signal, and an electromagnetic wave. A transitory computer readable medium can provide a program for a computer through wired communication channels such as an electric cable and an optical fiber, or a wireless communication channel.

The present disclosure is not limited to the aforementioned example embodiments and may be changed as appropriate within the scope thereof. Furthermore, the present disclosure may be implemented by combining the respective example embodiments as appropriate.

While the present invention has been described above with reference to the example embodiments, the present invention is not limited by the aforementioned example embodiments. Various changes and modifications that may be understood by a person skilled in the art may be made to the configurations and details of the present invention, within the scope of the present invention.

The example embodiments described above may also be described in part or in whole as the following Supplementary Notes but are not limited thereto.

Supplementary Note 1

An authentication device including:
a communication unit configured to, in registration processing of user equipment (UE), acquire UE key derivation function (KDF) capabilities indicating a pseudo random function supported by the UE;
a selection unit configured to select a pseudo random function used for generation of a master key related to the UE by use of the UE KDF capabilities; and
a key generation unit configured to generate a master key related to the UE by use of the selected pseudo random function.

Supplementary Note 2

The authentication device according to Supplementary Note 1, wherein
the key generation unit generates second authentication information by use of the master key, and
the communication unit sends the second authentication information to a network device.

Supplementary Note 3

The authentication device according to Supplementary Note 2, wherein the second authentication information includes a session key used for communication with the UE connected to a non-3rd Generation Partnership Project (3GPP) access network or a 3GPP access network.

Supplementary Note 4

The authentication device according to Supplementary Note 1, wherein the key generation unit generates the master key by use of first authentication information generated in a subscriber information management device and the selected pseudo random function.

Supplementary Note 5

The authentication device according to Supplementary Note 4, wherein the communication unit sends a message requesting the first authentication information, the message being addressed to the subscriber information management device, and receives the first authentication information in response to the message.

Supplementary Note 6

A network device including:
a communication unit configured to, in registration processing of a UE, acquire authentication information generated based on a master key generated by use of a pseudo random function supported by a UE indicated in UE KDF capabilities;
a storage unit configured to store the authentication information; and
a communication unit configured to, in re-registration processing of the UE, send the stored authentication information in response to a message requesting authentication information.

Supplementary Note 7

The network device according to Supplementary Note 6, wherein the authentication information includes a session key used for communication with the UE connected to a non-3GPP access network or a 3GPP access network.

Supplementary Note 8

A communication system including:
an authentication device configured to, in registration processing of a UE, generate a master key by use of a pseudo random function supported by a UE indicated in UE KDF capabilities and generate authentication information by use of the master key; and
a network device configured to store the authentication information acquired from the authentication device and, in re-registration processing of a UE, send the stored authentication information in response to a message requesting the authentication information.

Supplementary Note 9

The communication system according to Supplementary Note 8, wherein the authentication device generates second authentication information by use of the master key and sends the second authentication information to a network device.

Supplementary Note 10

An authentication method including:
in registration processing of user equipment (UE), acquiring UE key derivation function (KDF) capabilities indicating a pseudo random function supported by the UE;

selecting a pseudo random function used for generation of a master key related to the UE by use of the UE KDF capabilities; and generating a master key related to the UE by use of the selected pseudo random function.

Supplementary Note 11

An authentication method including:

in registration processing of a UE, acquiring authentication information generated based on a master key generated by use of a pseudo random function supported by a UE indicated in UE KDF capabilities;

storing the authentication information; and, in re-registration processing of the UE, sending the stored authentication information in response to a message requesting authentication information.

Supplementary Note 12

A non-transitory computer readable medium having a program stored thereon, the program causing a computer to execute:

in registration processing of user equipment (UE), acquiring UE key derivation function (KDF) capabilities indicating a pseudo random function supported by the UE;

selecting a pseudo random function used for generation of a master key related to the UE by use of the UE KDF capabilities; and generating a master key related to the UE by use of the selected pseudo random function.

Supplementary Note 13

A non-transitory computer readable medium having a program stored thereon, the program causing a computer to execute:

in registration processing of a UE, acquiring authentication information generated based on a master key generated by use of a pseudo random function supported by a UE indicated in UE KDF capabilities;

storing the authentication information; and in re-registration processing of the UE, sending the stored authentication information in response to a message requesting authentication information.

REFERENCE SIGNS LIST

10 AUTHENTICATION DEVICE
11 COMMUNICATION UNIT
12 SELECTION UNIT
13 KEY GENERATION UNIT
21 NG UE
31 NON-3GPP AN
32 gNB
40 NETWORK DEVICE
41 N3IWF
42 AMF
43 SEAF
44 AUSF
45 UDM
71 NETWORK INTERFACE
72 PROCESSOR
73 MEMORY
81 COMMUNICATION UNIT
82 CONTROL UNIT

The invention claimed is:

1. An authentication device comprising:
at least one memory storing instructions, and
at least one processor configured to execute the instructions to:
receive a registration request message including UE key derivation function (KDF) capabilities indicating a pseudo random function supported by the UE transmitted from the UE;
acquire the UE KDF capabilities;
select a pseudo random function used for generation of a master key related to the UE by use of the UE KDF capabilities; and
generate a master key related to the UE by use of the selected pseudo random function.

2. The authentication device according to claim 1, wherein
the at least one processor is further configured to execute the instructions to generate second authentication information by use of the master key, and
send the second authentication information to a network device.

3. The authentication device according to claim 2, wherein the second authentication information includes a session key used for communication with the UE connected to a non-3rd Generation Partnership Project (3GPP) access network or a 3GPP access network.

4. The authentication device according to claim 1, wherein the at least one processor is further configured to execute the instructions to generate the master key by use of first authentication information generated in a subscriber information management device and the selected pseudo random function.

5. The authentication device according to claim 4, wherein the at least one processor is further configured to execute the instructions to send a message requesting the first authentication information, the message being addressed to the subscriber information management device, and receives the first authentication information in response to the message.

6. A network device comprising:
at least one memory storing instructions, and
at least one processor configured to execute the instructions to:
in registration processing of a UE, acquire authentication information generated based on a master key generated by use of a pseudo random function supported by a UE indicated in UE KDF capabilities included in a registration request message transmitted from the UE;
store the authentication information; and
in re-registration processing of the UE, send the stored authentication information in response to a message requesting authentication information.

7. The network device according to claim 6, wherein the authentication information includes a session key used for communication with the UE connected to a non-3GPP access network or a 3GPP access network.

8. An authentication method comprising:
receiving a registration request message including user equipment (UE) key derivation function (KDF) capabilities indicating a pseudo random function supported by the UE transmitted from the UE;
acquiring the UE KDF capabilities;
selecting a pseudo random function used for generation of a master key related to the UE by use of the UE KDF capabilities; and
generating a master key related to the UE by use of the selected pseudo random function.

9. The authentication device according to claim 1, wherein the at least one processor is further configured to execute the instructions to:

acquire a Subscriber Parameter Identifier (SUPI) in the registration processing of the UE, and generate the master key related to the UE by use of the selected pseudo random function and the SUPI.

10. The authentication device according to claim 5, wherein the at least one processor is further configured to execute the instructions to:

generate second authentication information by use of the master key, and send the second authentication information to a network device.

* * * * *